(12) United States Patent
Yokokawa et al.

(10) Patent No.: US 10,827,155 B2
(45) Date of Patent: Nov. 3, 2020

(54) IMAGE PROCESSING APPARATUS AND IMAGING APPARATUS FOR RESTORING A GRADATION OF A CHROMA SIGNAL USING A BRIGHTNESS SIGNAL AS GUIDE INFORMATION

(71) Applicant: SONY CORPORATION, Tokyo (JP)

(72) Inventors: Masatoshi Yokokawa, Kanagawa (JP); Takahiro Nagano, Kanagawa (JP); Masashi Uchida, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/483,551

(22) PCT Filed: Dec. 20, 2017

(86) PCT No.: PCT/JP2017/045616
§ 371 (c)(1),
(2) Date: Aug. 5, 2019

(87) PCT Pub. No.: WO2018/159076
PCT Pub. Date: Sep. 7, 2018

(65) Prior Publication Data
US 2020/0029060 A1  Jan. 23, 2020

(30) Foreign Application Priority Data
Mar. 2, 2017  (JP) .................. 2017-039265

(51) Int. Cl.
*H04N 9/68*  (2006.01)
*H04N 9/64*  (2006.01)
*H04N 5/235*  (2006.01)
*H04N 9/09*  (2006.01)

(52) U.S. Cl.
CPC .......... *H04N 9/646* (2013.01); *H04N 5/2355* (2013.01); *H04N 9/09* (2013.01)

(58) Field of Classification Search
CPC ......... H04N 9/646; H04N 9/09; H04N 5/2355
USPC ........................................... 348/234
See application file for complete search history.

(56) References Cited

U.S. PATENT DOCUMENTS

| 2015/0078678 A1* | 3/2015 | Grandin | G06T 11/60 |
| | | | 382/284 |
| 2015/0282071 A1* | 10/2015 | Nakaya | H04M 1/22 |
| | | | 455/566 |

FOREIGN PATENT DOCUMENTS

JP  2002-171430 A  6/2002

* cited by examiner

*Primary Examiner* — Usman A Khan
(74) *Attorney, Agent, or Firm* — Paratus Law Group, PLLC

(57) ABSTRACT

An image processing apparatus is provided to alleviate degradation of the gradation of a color image in the case where images having a sensitivity different from each other are obtained by imaging one same object in black-and-white and color. The image processing apparatus includes a gradation control part obtaining a brightness signal representing a black-and-white image and a chroma signal representing a color image obtained by imaging a same object as that for the black-and-white image and that controls gradation of the chroma signal on the basis of the brightness signal. This configuration can suppress degradation of the gradation of a color image to be minimal in the case where images having a sensitivity different from each other are obtained by imaging one same object in black-and-white and color.

14 Claims, 27 Drawing Sheets

FIG.12

| $\alpha$ | $\sigma$ |
|---|---|
| $0 \leqq \alpha < 0.25$ | $\sigma 1$ |
| $0.25 \leqq \alpha < 0.5$ | $\sigma 2$ |
| $0.5 \leqq \alpha < 0.75$ | $\sigma 3$ |
| $0.75 \leqq \alpha \leqq 1$ | $\sigma 4$ |

$\sigma_1 < \sigma_2 < \sigma_3 < \sigma_4$

FIG.15

| $\alpha$ | CLASSIFICATION NUMBER |
|---|---|
| $0 \leqq \alpha < 0.25$ | 1 |
| $0.25 \leqq \alpha < 0.5$ | 2 |
| $0.5 \leqq \alpha < 0.75$ | 3 |
| $0.75 \leqq \alpha \leqq 1$ | 4 |

$$I = b \times \{a \times A + (1-a) \times B\} + (1-b) \times \{a \times C + (1-a) \times D\}$$

I: INTERPOLATED OUTPUT

IMAGE PROCESSING APPARATUS AND IMAGING APPARATUS FOR RESTORING A GRADATION OF A CHROMA SIGNAL USING A BRIGHTNESS SIGNAL AS GUIDE INFORMATION

CROSS REFERENCE TO PRIOR APPLICATION

This application is a National Stage Patent Application of PCT International Patent Application No. PCT/JP2017/045616 (filed on Dec. 20, 2017) under 35 U.S.C. § 371, which claims priority to Japanese Patent Application No. 2017-039265 (filed on Mar. 2, 2017), which are all hereby incorporated by reference in their entirety.

TECHNICAL FIELD

This disclosure relates to an image processing apparatus and an imaging apparatus.

BACKGROUND ART

As a technique of producing an HDR image from plural digital images, a technique is present according to which one same object is imaged varying the sensitivity (the exposure) of a camera and the obtained plural images are synthesized with each other to produce an HDR image. For example, PTL 1 below discloses a technique according to which an object is imaged by a multi-eye camera that includes plural imaging systems corresponding to plural optical blocks and that causes the sensitivity for brightness to differ for each of the imaging systems, and the obtained plural images are synthesized with each other to produce an HDR image.

CITATION LIST

Patent Literature

[PTL 1]
Japanese Patent Laid-open No. 2002-171430

SUMMARY

Technical Problems

However, with the technique described in Patent Literature 1 above, the gradation may be degraded for the low sensitivity camera. Especially, when the sensitivity of a camera capturing a color image is low, a problem arises that the image quality of an HDR image is degraded because of the degradation of the gradation.

It is therefore demanded to alleviate degradation of the gradation of a color image in the case where images having different sensitivities are obtained by imaging one same object in black-and-white and color.

Solution to Problems

According to this disclosure, an image processing apparatus is provided that includes a gradation control part that obtains a brightness signal of a black-and-white image and a chroma signal of a color image obtained by imaging a same object as that for the black-and-white image, and that controls gradation of the chroma signal on the basis of the brightness signal.

Moreover, according to this disclosure, an imaging apparatus is provided that includes a first imaging element that images an object to obtain a black-and-white image, a second imaging element that images the object to obtain a color image, and an image processing apparatus that obtains a brightness signal of the black-and-white image and a chroma signal of the color image and that controls gradation of the chroma signal on the basis of the brightness signal.

Advantageous Effect of Invention

As has been described above, according to this disclosure, alleviation of degradation of the gradation of a color image is enabled in the case where images having different sensitivities are obtained by imaging one same object into a black-and-white image and the color image.

In addition, the above effect is not necessarily a limiting one and any of the effects described in this specification or other effects understood from this specification may be achieved together with the above effect or instead of the above effect.

BRIEF DESCRIPTION OF DRAWINGS

FIG. 12 is a schematic diagram depicting a table that is used when a filter factor switching part switches the filter factor of the lowpass filter.

FIG. 15 is a schematic diagram depicting a table that defines each classification number corresponding to the map value α.

DESCRIPTION OF EMBODIMENT

A preferred embodiment of this disclosure will be described below in detail with reference to the accompanying drawings. In addition, in this specification and the drawings, constituent elements having the substantially same functions and configurations are given the same reference signs and will thereby not again be described.

The description will be made in the following order.
1. Principle of This Embodiment
2. Image Processing Apparatus According to First Exemplary Configuration
3. Image Processing Apparatus According to Second Exemplary Configuration
4. Exemplary Configuration of HDR-Synthesizing Part
5. Exemplary Configuration of Gradation Control Part
6. About Processes Executed in This Embodiment
7. Effect Achieved by This Embodiment
8. About Variations of This Embodiment 1 Principle of this Embodiment This embodiment relates to a process of executing high dynamic range (HDR) synthesis using a color image sensor (Bayer IS) and a black-and-white image sensor (B/W IS). The HDR synthesis aiming at alleviating any blurring of a moving object part is executed using a high sensitivity performance that is a feature of the black-and-white image sensor.

Figure 1:
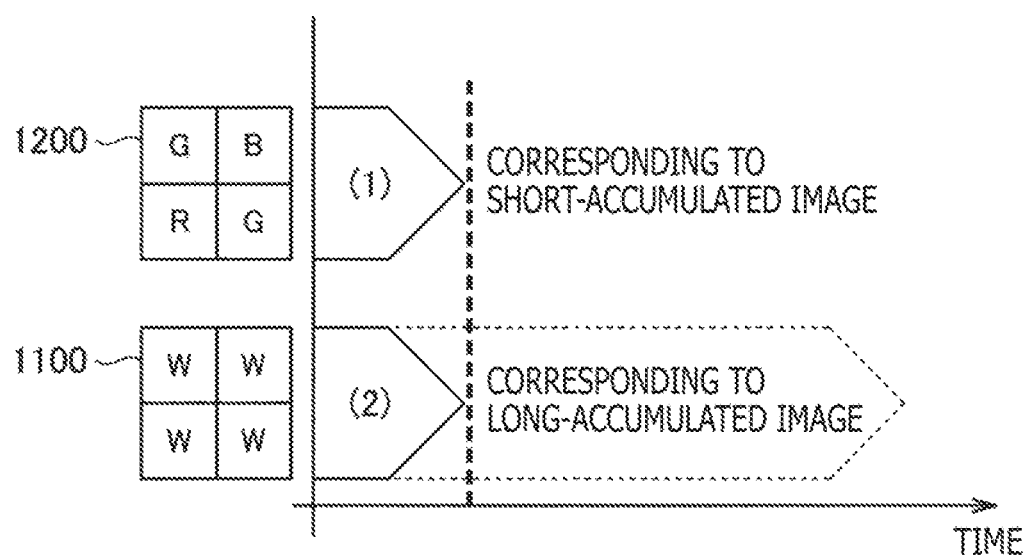
FIG. 1 is a schematic diagram depicting the principle of this embodiment.

FIG. 1 is a schematic diagram depicting the principle of this embodiment. FIG. 1 depicts the case where imaging is executed at one same time of day for one same time period for exposure to light using a black-and-white image imaging element 1100 and a color image imaging element 1200. In this case, the sensitivity of the black-and-white image imaging element 1100 is higher than that of the color image imaging element 1200, and each of pixels of the black-and-white image imaging element 1100 therefore corresponds to a long-time light exposure pixel (a long-accumulated image (2)) and each of pixels of the color image imaging element 1200 corresponds to a short-time light exposure pixel (a short-accumulated image (1)). For example, when the sensitivity of the black-and-white image imaging element 1100 is four times higher than that of the color image imaging element 1200, different light exposure imaging for the HDR can be executed for an exposure difference of a four-fold value. A long-accumulated image and a short-accumulated image that are captured in the same time zone can thereby be synthesized with each other, and generation of any blurring can be suppressed especially when an object with motions (a moving object) is imaged.

On the other hand, in the case where a long-time exposure to light and a short-time exposure to light are sequentially executed each at a time of day different from that of each other and each with a time period for exposure to light different from that of each other using the one color image imaging element 1200, the short-accumulated image and the long-accumulated image are imaged each at the time of day different from that of each other and blurring is generated especially when a moving object is imaged.

According to an approach of this embodiment depicted in FIG. 1, the HDR synthesis without generation of any blurring is therefore enabled even for a moving object. For assigning cameras (imaging elements) corresponding to the long-accumulated image and the short-accumulated image, a high-sensitivity camera is assigned to the long-accumulated image. The black-and-white image imaging element 1100 therefore images an image corresponding to the long-accumulated image and the color image imaging element 1200 images an image corresponding to the short-accumulated image. Furthermore, because both of the black-and-white image imaging element 1100 and the color image imaging element 1200 are used, for the synthesis, the parallax difference between these images is detected and alignment with each other is executed. The specific configuration of this embodiment will be described below.

2. Image Processing Apparatus According to First Exemplary Configuration

Figure 2:
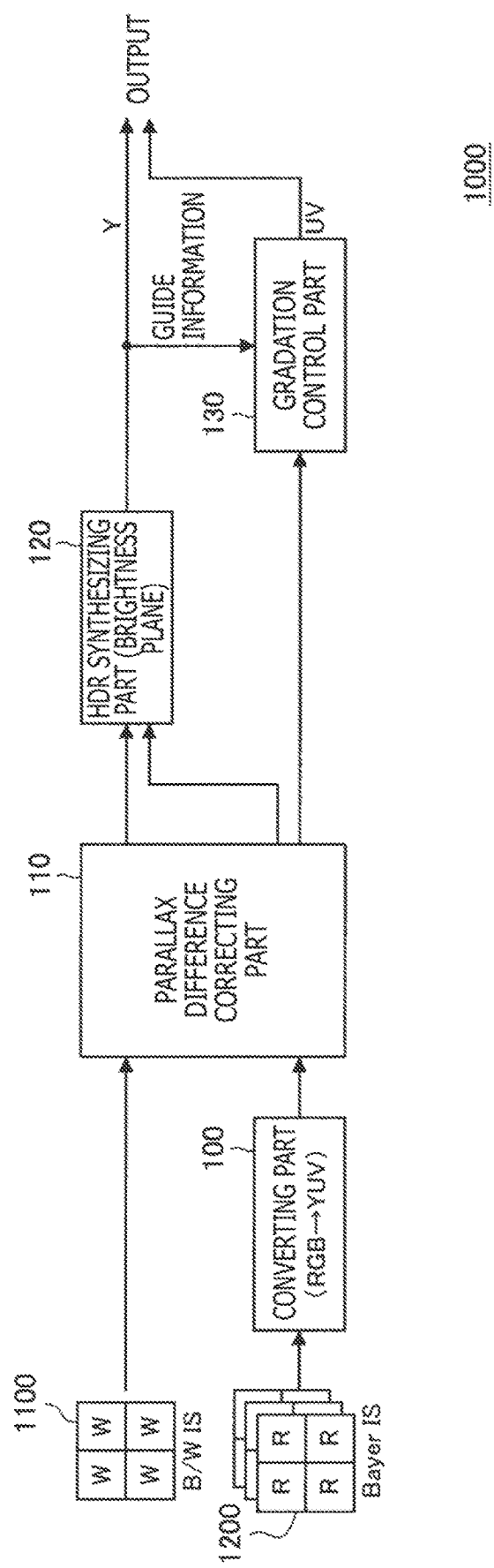
FIG. 2 is a schematic diagram depicting the configuration of an image processing apparatus and the vicinity thereof according to a first exemplary configuration of this embodiment.

FIG. 2 is a schematic diagram depicting the configuration of an image processing apparatus 1000 and the vicinity thereof according to a first exemplary configuration of this embodiment. The configuration depicted in FIG. 2 executes the HDR synthesis using only the brightness and it is generally said that the computation efficiency thereof is high. The image processing apparatus 1000 includes a converting part 100, a parallax difference correcting part 110, an HDR-synthesizing part 120, and a gradation control part 130.

In FIG. 2, the black-and-white image imaging element 1100 and the color image imaging element 1200 execute the imaging using the approach depicted in FIG. 1. A signal of the black-and-white image obtained by imaging the object by the black-and-white image imaging element 1100 (a brightness signal) is sent to the parallax difference correcting part 110. Moreover, an RGB signal of the color image obtained by imaging the object by the color image imaging element 1200 is sent to the converting part 100. The converting part 100 converts the RGB signal of the color image into a YUV signal. The YUV signal is sent to the parallax difference correcting part 110.

The parallax difference correcting part 110 detects the parallax difference from the brightness signal of the black-and-white image and the YUV signal obtained from the color image, and corrects any position gap between the brightness signal of the black-and-white image and the brightness signal of the color image. The brightness signal of the black-and-white image and the brightness signal of the color signal whose position gap present therebetween is corrected are sent to the HDR-synthesizing part 120. Moreover, the chroma signal of the color image whose position gap is corrected (a UV signal) is sent to the gradation control part 130.

The HDR-synthesizing part 120 handles the brightness signal input thereinto of the black-and-white image as the long-accumulated image, handles the brightness signal input thereinto of the color image as the short-accumulated image, and HDR-synthesizes these two with each other. A brightness signal whose dynamic range is expanded is thereby output. In this manner, with the configuration depicted in FIG. 2, the HDR synthesis is executed for the brightness and the computation efficiency can therefore be improved.

The brightness signal whose dynamic range is expanded is input into the gradation control part 130. The gradation control part 130 adjusts the gradation of the chroma signal using this brightness signal as guide information. In the case where the time period for exposure to light of the color image imaging element 1200 is short, the color image may have crushed shadows and the like generated therein while the crushed shadows and the like can be resolved by adjusting the gradation of the chroma signal using the brightness signal whose dynamic range is expanded, as the guide information. When the chroma signal whose gradation is adjusted is output from the gradation control part 130 as above, the YUV signal whose dynamic range is expanded can be obtained together with the brightness signal output from the HDR-synthesizing part 120.

3. Image Processing Apparatus According to Second Exemplary Configuration

Figure 3:
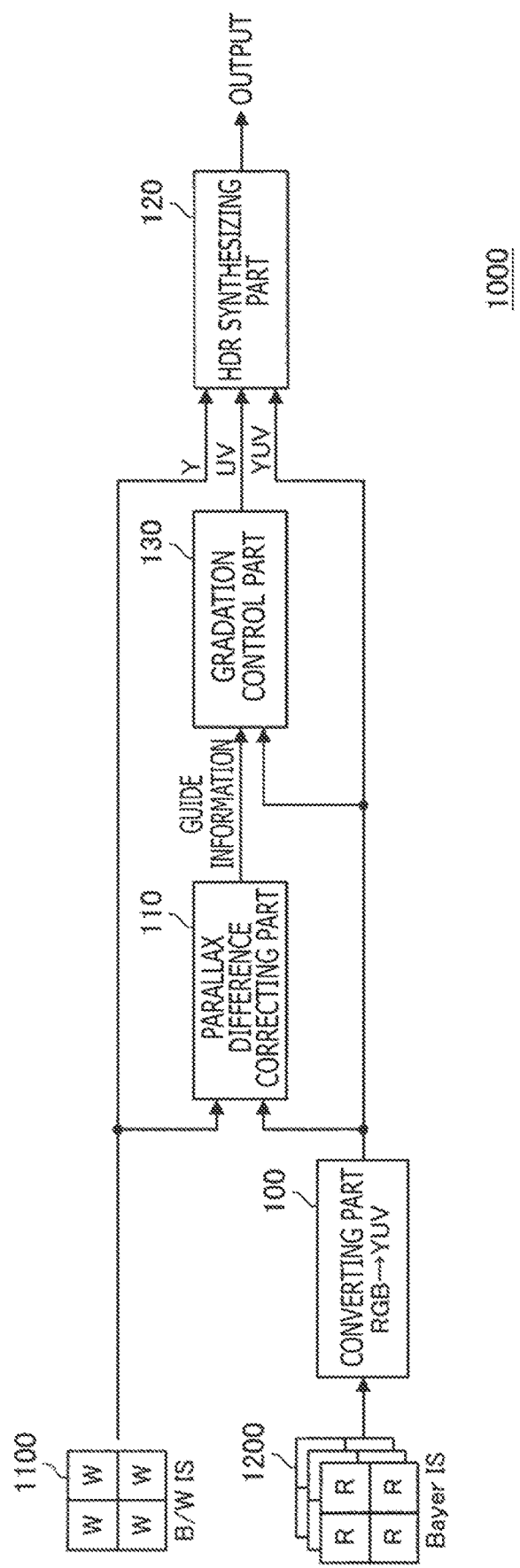
FIG. 3 is a schematic diagram depicting the configuration of an image processing apparatus and the vicinity thereof according to a second exemplary configuration of this embodiment.

FIG. 3 is a schematic diagram depicting the configuration of an image processing apparatus 1000 and the vicinity thereof according to a second exemplary configuration of this embodiment. The configuration depicted in FIG. 3 executes the HDR synthesis using both of the brightness signal and the chroma signal. In this regard, the chroma signal is produced using only the signal obtained from the side of the color image imaging element 1200 and executing the HDR synthesis therefore does not make any sense. The configuration depicted in FIG. 3 has an advantage that the existing HDR synthesis processing block can also be used.

In FIG. 3, the processes by the converting part 100 and the parallax difference correcting part 110 are similar to those in FIG. 2. The brightness signal of the black-and-white image whose position gap is corrected by the parallax difference correcting part 110 is sent to the gradation control part 130. Moreover, the chroma signal obtained by the conversion by the converting part 100 is sent to the gradation control part 130. The gradation control part 130 adjusts the gradation of the chroma signal using the brightness signal of the black-and-white image as a guide signal. The chroma signal thereby becomes a color long-accumulated image together with the brightness signal of the black-and-white image, and is input into the HDR-synthesizing part 120.

On the other hand, the YUV signal output from the converting part 100 is input into the HDR-synthesizing part 120 as a color short-accumulated image. The HDR-synthesizing part 120 executes the HDR synthesis using an ordinary approach and using the color long-accumulated image and the color short-accumulated image that are input thereinto.

In addition, the imaging apparatus according to this embodiment includes the image processing apparatus 1000 and the imaging elements 1100 and 1200 according to the first or the second exemplary configuration.

4. Exemplary Configuration of HDR-Synthesizing Part

Figure 4:
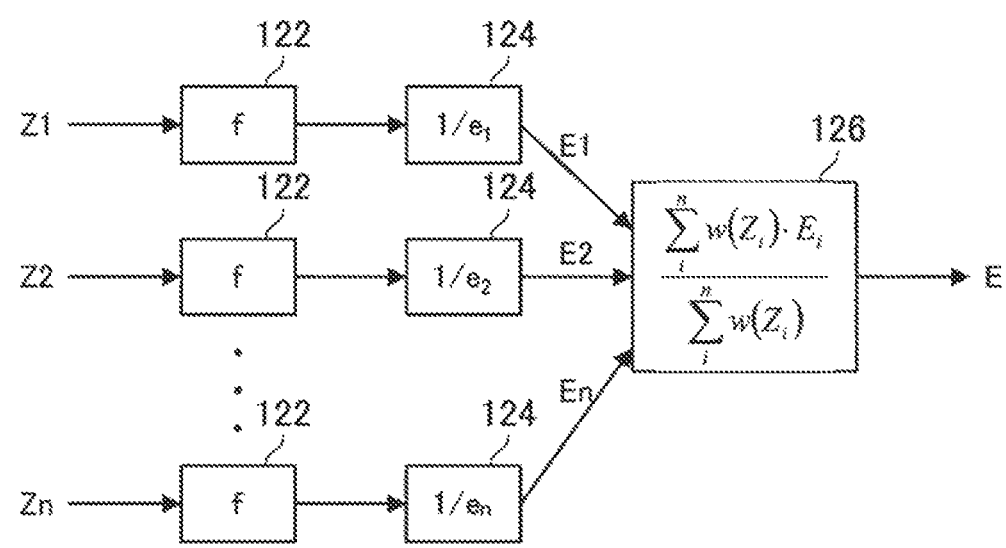
FIG. 4 is a schematic diagram depicting the configuration of an HDR-synthesizing part.

FIG. 4 is a schematic diagram depicting the configuration of the HDR-synthesizing part 120. The HDR-synthesizing part 120 executes the HDR synthesis using an ordinary approach. In FIG. 4, Z1, Z2, to Zn each represent a pixel value, and n represents the number of the cameras. For each of the pixel values, a process of returning a non-linear image signal to a linear image signal is executed by a camera response function 122 in addition, when the input is a linear signal, the process executed by the camera response function 122 is unnecessary.

Figure 5:
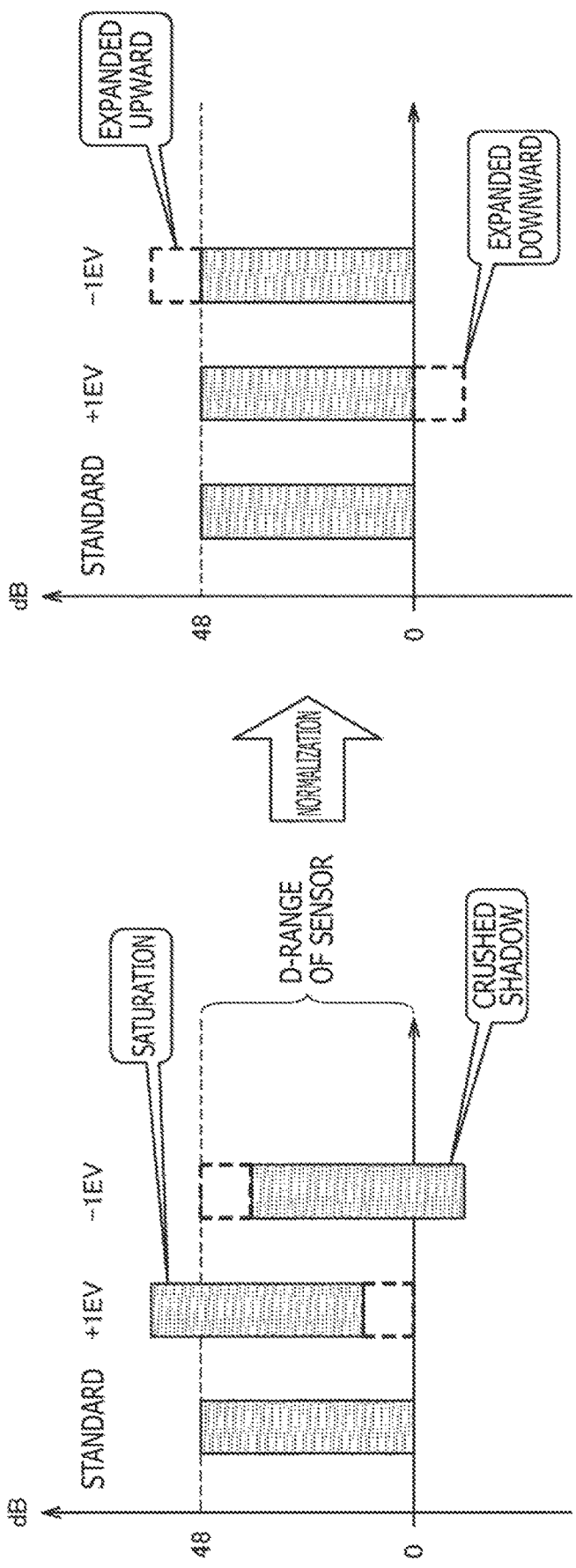
FIG. 5 is a schematic diagram depicting a process executed by a normalizing part.

A normalizing part 124 executes a process of normalizing the luminance level. FIG. 5 is a schematic diagram depicting a process executed by the normalizing part 124. In FIG. 5, it is assumed that three types of exposure to light are executed that are the standard exposure to light, an exposure to light of +1 EV, and an exposure to light of −1 EV. The axis of ordinate in FIG. 5 represents the luminance level and, assuming that the dynamic range of the sensor is 48 dB, the imaging is executed with the luminance in the range of 0 to 48 dB (corresponding to 10 bits, a 1,024-fold luminance) in the standard exposure to light. In the long-accumulated image of +1 EV, because the time period for the exposure to light is long, even a darker point can therefore be imaged. Moreover, in the short-accumulated image of −1 EV, the time period for the exposure to light is short and even a brighter point can be imaged.

For the normalization of the luminance level, a process is executed to match the luminance with an optional criterion (that corresponds to the standard exposure to light in this case). The luminance levels of the standard exposure to light, the exposure to light of +1 EV, and the exposure to light of −1 EV are aligned, the dynamic range is expanded to the lower side for the exposure to light of the exposure to light of +1 EV, and the dynamic range is expanded to the upper side for the exposure to light of −1 EV by executing the normalization. The dynamic range can thereby be expanded by synthesizing the images of the standard exposure to light, the exposure to light of +1 EV, and the exposure to light of −1 EV.

Returning back to FIG. 4, a synthesizing part 126 executes a process of adding the normalized luminance levels E1, E2, to En in accordance with the following equation (1). In addition, in the equation (1), n is the number of the cameras (the number of captured images).

[Math. 1]

$$\frac{\sum_{i}^{n} w(Z_i) \cdot E_i}{\sum_{i}^{n} w(Z_i)} \qquad (1)$$

5. Exemplary Configuration of Gradation Control Part

Figure 6:
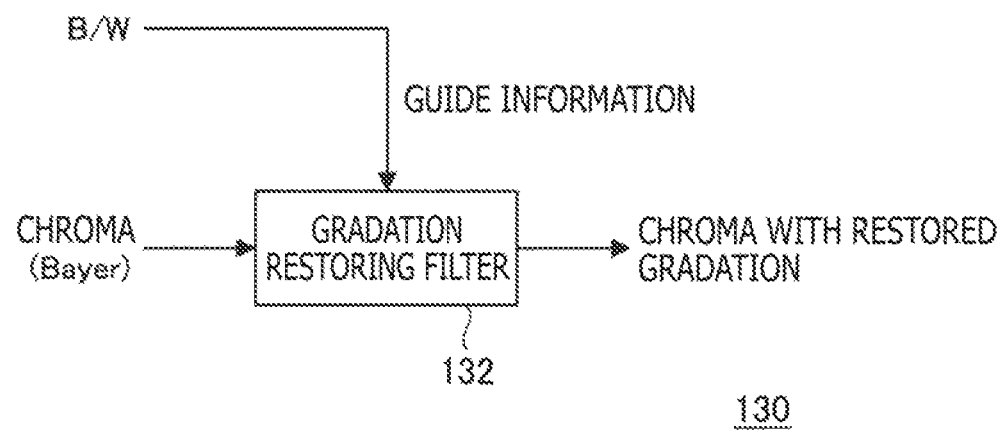
FIG. 6 is a schematic diagram depicting an exemplary configuration of a gradation control part.

FIG. 6 is a schematic diagram depicting an exemplary configuration of the gradation control part 130. The gradation control part 130 restores the gradation of the chroma signal by applying a gradation restoring filter 132 to the chroma signal using the brightness signal of the black-and-white image as a guide. A joint-bilateral-type filter as described below is usable as the gradation restoring filter 132.

[Math. 2]

$$g(i, j) = \frac{\sum_n \sum_m f(i+m, j+n)w(m, n)}{\sum_n \sum_m w(m, n)}$$

$$w = w_{space} w_{color}$$

$$w_{space}(x, y) = \frac{1}{2\pi\sigma_{space}} \exp\left(-\frac{x^2 + y^2}{2\sigma_{space}^2}\right)$$

$$w_{color}(x, y) = \frac{1}{2\pi\sigma_{color}} \exp\left(-\frac{(f'(i, j) - f'(i+m, j+n))^2}{2\sigma_{color}^2}\right)$$

In the above equations, f represents an input image of the chroma signal, f' represents a guide image (the brightness value of the black-and-white image), g represents an output image after a filter process, i and j represent central pixel positions, m and n represent filter taps, w represents a filter factor, and σ represents an intensity parameter. Moreover, $w_{space}$(x,y) represents the filter factor of the weight for the space domain, and the filter factor becomes smaller as a pixel is more distant from the center of the filter. Moreover, $w_{color}$(x,y) represents the filter factor of the weight for the color range, and the filter factor becomes smaller as the color (the brightness) is more different from that of the center of the filter. Moreover, x, y represents the position of a pixel in the tap having the center of the filter as the origin.

Figure 7:
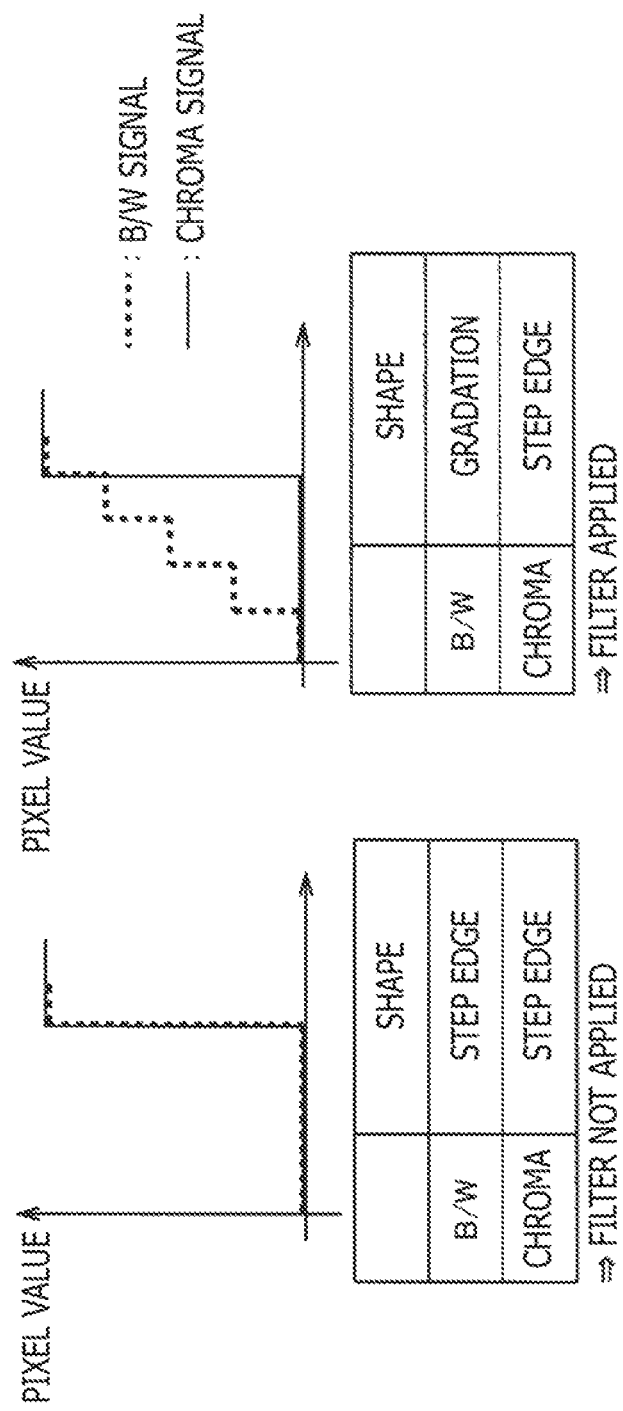
FIG. 7 is a schematic diagram depicting a function of a guide signal.

FIG. 7 is a schematic diagram depicting a function of the guide signal. As depicted in FIG. 7, in the case where the brightness signal of the black-and-white image (B/W) is a step edge and the chroma signal is a step edge, the filter is not applied. On the other hand, in the case where the brightness signal of the black-and-white image (B/W) is gradation and the chroma signal is a step edge, the filter is applied and the chroma signal becomes gradation. The gradation of the chroma signal can be adjusted using the brightness signal of the black-and-white image as the guide.

Figure 8:
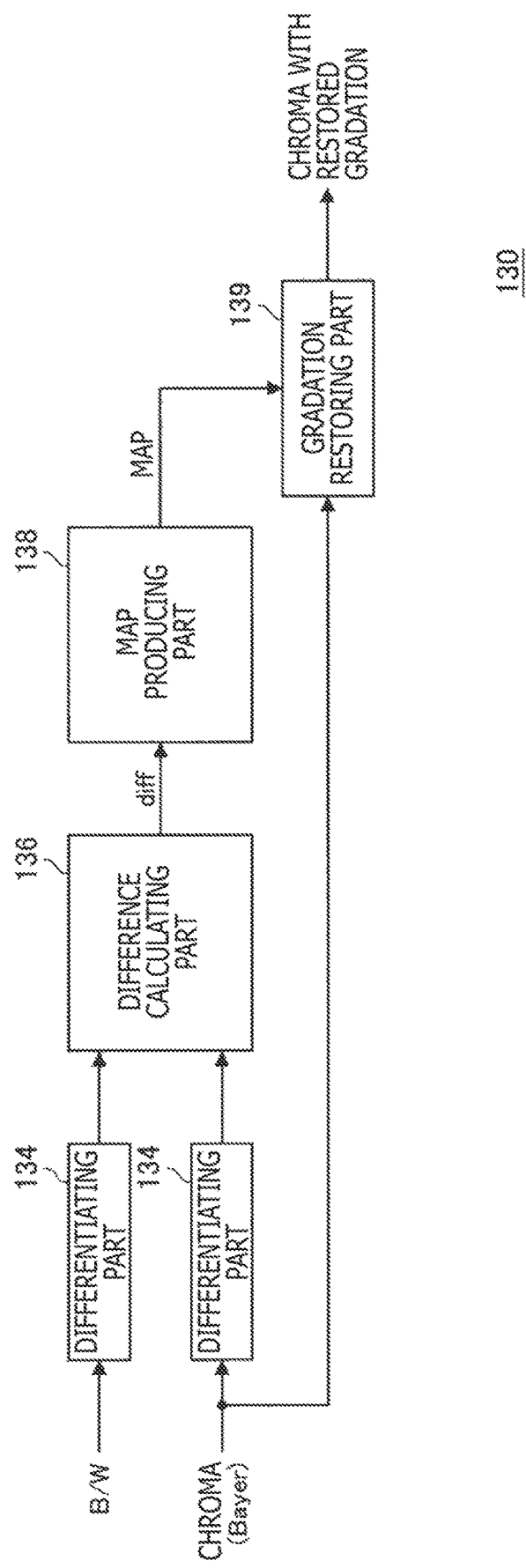
FIG. 8 is a schematic diagram of another exemplary configuration of the gradation control part.
Figure 9:
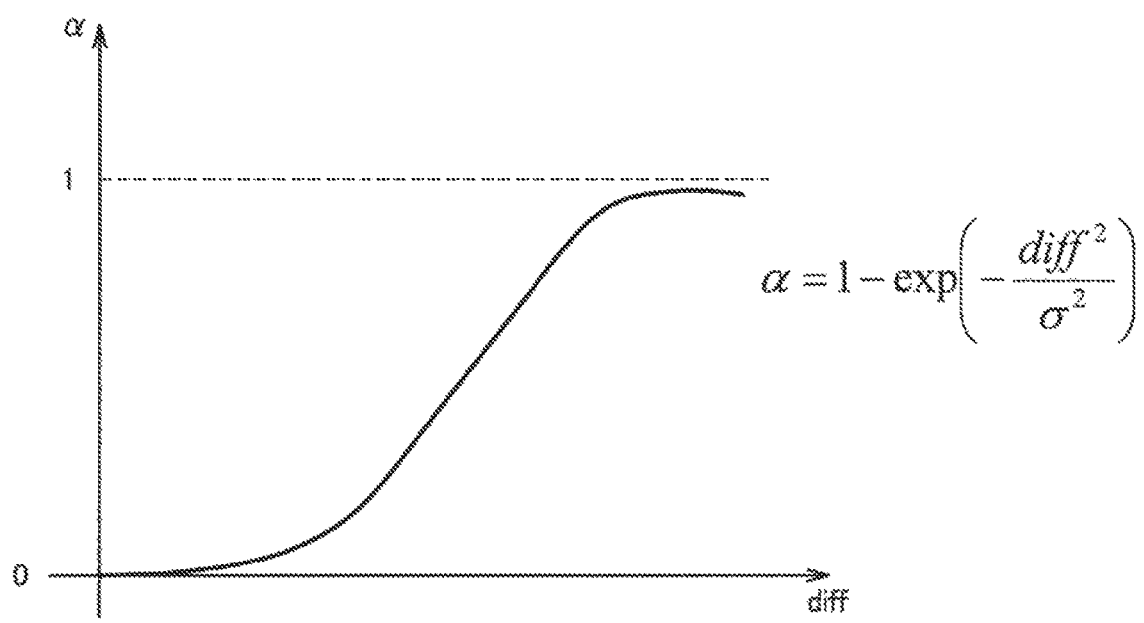
FIG. 9 is a property diagram depicting a map that defines the relation between degradation of the gradation and a value α.

FIG. 8 is a schematic diagram of another exemplary configuration of the gradation control part 130. As depicted in FIG. 8, the gradation control part 130 includes a differentiating part 134a, a differentiating part 134b, a difference calculating part 136, a map producing part 138, and a gradation restoring part 139. In this configuration, the differentiating part 134a and the differentiating part 134b calculate differential values (the differential images) respectively of the brightness signal of the black-and-white image and the chrome signal of the color image, and the difference calculating part 136 determines a difference value diff between these differential values. The map producing part 138 thereafter produces the map depicted in FIG. 9 using the difference value. This map indicates therein that the difference value becomes greater as the α-value becomes closer to 1 on the axis of ordinate and degradation of the gradation occurs. The gradation restoring part 139 therefore restores the chroma signal on the basis of this map. As an example, the map can be represented by an equation depicted in FIG. 9.

Figure 10:
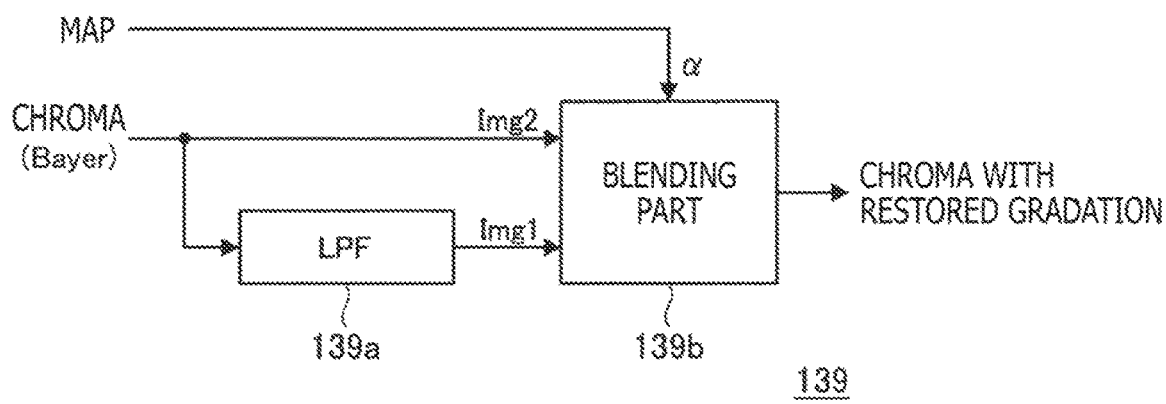
FIG. 10 is a schematic diagram depicting the configuration of a gradation restoring part in FIG. 9.

FIG. 10 is a schematic diagram depicting the configuration of the gradation restoring part 139 in FIG. 8. The gradation restoring part 139 includes a lowpass filter 139a and a blending part 139b. A chrome image (Img1) is prepared to which the lowpass filter 139a is applied to remove the degradation of the gradation, and the blending part 139b blends a chroma image (Img2) to which the lowpass filter 139a is not applied and the chrome image (Img1) to which the lowpass filter 139a is applied with each other on the basis of an equation (2) below using the map value α in FIG. 9.

[Math. 3]

$$out = \alpha \times Img_1 + (1-\alpha) \times Img_2 \quad (2)$$

As the value of α is closer to zero, the possibility for the gradation to be degraded is lower and the chroma image (Img2) to which the lowpass filter 139a is not applied is therefore more heavily used. On the other hand, as the value of α is closer to 1, the possibility for the gradation to be degraded is higher and the chroma image (Img1) to which the lowpass filter 139a is applied is more heavily used. The chroma image can be more blunted as the possibility for the gradation to be degraded becomes higher and the gradation of the chroma image can be enhanced.

Figure 11:
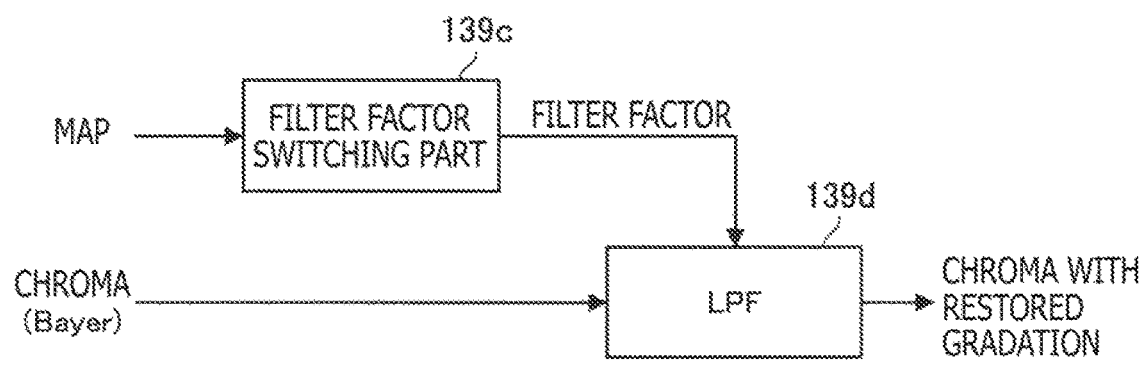
FIG. 11 is a schematic diagram depicting an example where a filter factor of a lowpass filter is switched on the basis of a map value α.

Moreover, FIG. 11 is a schematic diagram depicting another configuration of the gradation restoring part 139 in FIG. 8, and is a schematic diagram depicting an example where the filter factor of a low-pass filter is switched on the basis of the map value α. As depicted in FIG. 11, a filter factor switching part 139c switches the filter factor of a lowpass filter 139d. FIG. 12 is a schematic diagram depicting a table that is used when the filter factor switching part 139c switches the filter factor of the lowpass filter 139d. The chroma signal is blunted using a strong filter factor because, as depicted in FIG. 12, the intensity of the lowpass filter 139a is increased as the map value α is greater, that is, the difference between the brightness value of the black-and-white image and that of the chroma signal becomes greater. The filter factor w(i,j) is determined from the equation (3) below. In the equation (3), x and y represent the position of the filter tap to be calculated, and σ represents the intensity parameter. As depicted in FIG. 12, the value of the intensity parameter σ becomes greater as the value of α becomes greater (σ1<σ2<σ3<σ4). The chroma image can thereby be blunted using a more intensive filter factor as the probability for the gradation to be degraded is higher, and the gradation of the chroma image can be enhanced.

[Math. 4]

$$w(x, y) = \frac{1}{\sum_n \sum_m w(m, n)} \times \exp\left(-\frac{x^2 + y^2}{2\sigma_{space}^2}\right) \quad (3)$$

Figure 13:
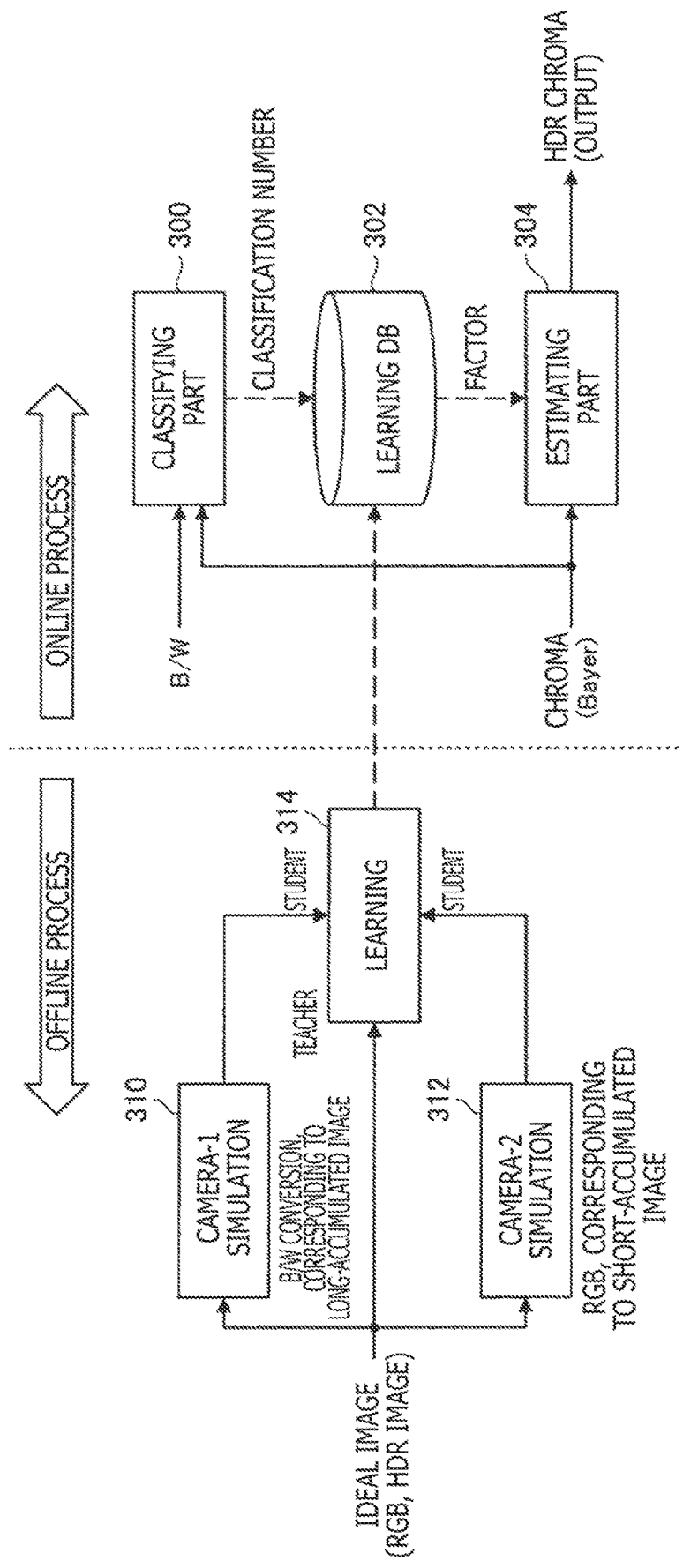
FIG. 13 is a schematic diagram depicting another exemplary configuration of the gradation control part.

FIG. 13 is a schematic diagram depicting another exemplary configuration of the gradation control part 130. In the configuration depicted in FIG. 13, the gradation restoration is executed using a frame work of learning. The use of the frame work of the learning facilitates the optimal control and designing of the estimated factor, compared to those of the configuration of the model base depicted in FIG. 6 and FIG. 8.

More specifically, the relation between the map values α and σ is determined in advance in the configurations of the model base depicted in FIG. 6 and FIG. 8 while, in the case where the frame work of the learning is used, these relation properties can flexibly be determined in accordance with the learning.

As depicted in FIG. 13, the configuration of an online process of the gradation control part 130 includes a classifying part 300, a learning database 302, and an estimating part 304. The classifying part 300 classifies the waveform patterns (the degrees of degradation of the gradation) of the input signals, and determines the filter factor number to be used in the estimating part 304. The estimating part 304 obtains the filter factor from the learning database 302 in accordance with the factor number, and executes a filtering process.

On the other hand, the configuration of an offline process of the gradation control part 130 includes a first camera simulation part 310, a second camera simulation part 312, and a learning part 314. The first camera simulation part 310 is a component simulating the first camera that corresponds to the long-accumulated image and executes as an example a simulation corresponding to the imaging element 1100 of the black-and-white image. Moreover, the second camera simulation part 312 is a component simulating the second camera that corresponds to the short-accumulated image and executes as an example a simulation corresponding to the imaging element 1200 of the color image. An ideal image to which the HDR synthesis is applied is input into the first camera simulation part 310 and the second camera simulation part 312. The first camera simulation part 310 and the second camera simulation part 312 each image the ideal image and each send the result to the learning part 314. The image data by the first camera simulation part 310 corresponds to the guide information and the image data by the second camera simulation part 312 corresponds to the degraded image whose gradation is degraded. Moreover, the ideal image is also sent to the learning part 314. The learning part 314 compares the ideal image with the images imaged by the first camera simulation part 310 and the second camera simulation part 312, and executes learning. In the learning, the filter factor to obtain the ideal image is calculated on the basis of the guide information by the first camera simulation part 310 and the degraded image by the second camera simulation part 312. The result of the learning is sent to the learning database 302. The learning database 302 stores therein the degree of the degraded image (the classification number depicted in FIG. 15) and the filter factor linking these with each other.

Figure 14:
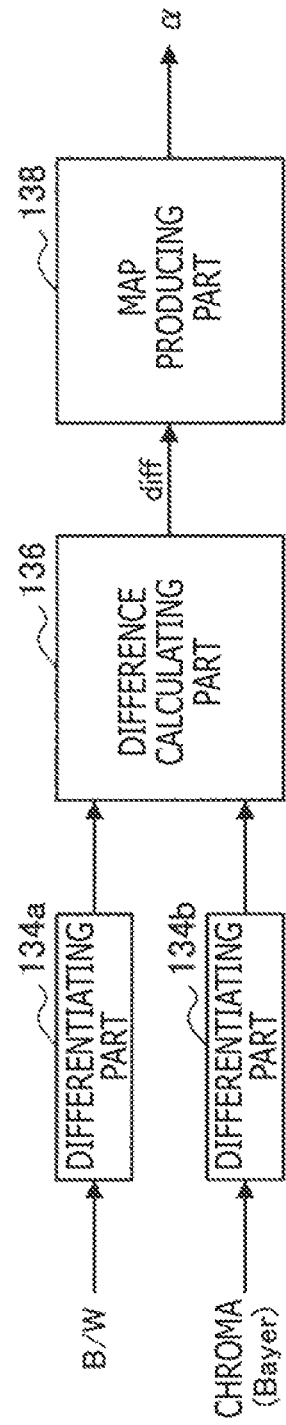
FIG. 14 is a schematic diagram depicting the configuration of a classifying part.

FIG. 14 is a schematic diagram depicting the configuration of the classifying part 300. The classifying part 300 is configured similarly to the gradation control part 130 depicted in FIG. 8, and includes the differentiating part 134*a*, the differentiating part 134*b*, the difference calculating part 136, and the map producing part 138. The classifying part 300 determines the map value α using the similar approach as that in FIG. 8 and obtains the classification number that corresponds to the map value α from the table depicted in FIG. 15. In addition, the table depicted in FIG. 15 is an example and the relation between the map value α and the classification number may also be defined at more levels. The estimating part 304 obtains the filter factor corresponding to the classification number from the learning database 302 and executes the filtering process. The estimating part 304 executes the filtering process for an input x(i,j),n from an equation (4) below, and obtains an output X(i,j). In the equation (4), W(i,j),n is a filter factor obtained from the database 302 in accordance with the classification number in FIG. 15.

[Math. 5]

$$X_{(i,j)} = \sum_n^{tanp\ num} w_{(i,j),n} \times x_{(i,j),n} \quad (4)$$

Figure 16:
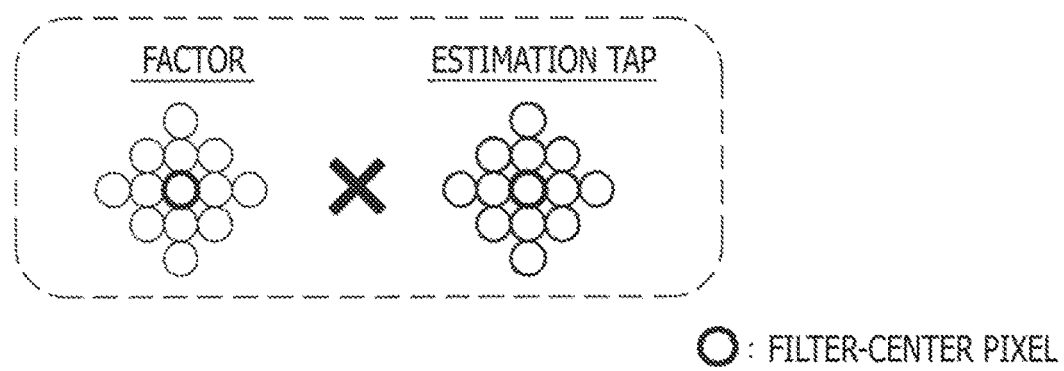
FIG. 16 is a schematic diagram depicting a filtering process.

In the filtering process by the equation (4), as depicted in FIG. 16, for the central pixel for which the filtering process is executed, plural pixels (n pixels) surrounding the central pixel are set, and the output X(i,j) determined by executing the filtering process for the central pixel on the basis of the pixel value of the central pixel and the pixel values of the pixels surrounding the central pixel and the filter factor corresponding to the central pixel and the filter factors of the pixels surrounding the central pixel. The value of the guide corresponding to the degradation and accumulated by the learning can be used.

As above, according to the exemplary configuration depicted in FIG. 14, the use of the optimal filter factor to obtain the ideal image is enabled corresponding to the degradation, by accumulating the filter factors that each define the relation among the guide information, the degraded image, and the ideal image.

6. About Processes Executed in this Embodiment

Figure 17:
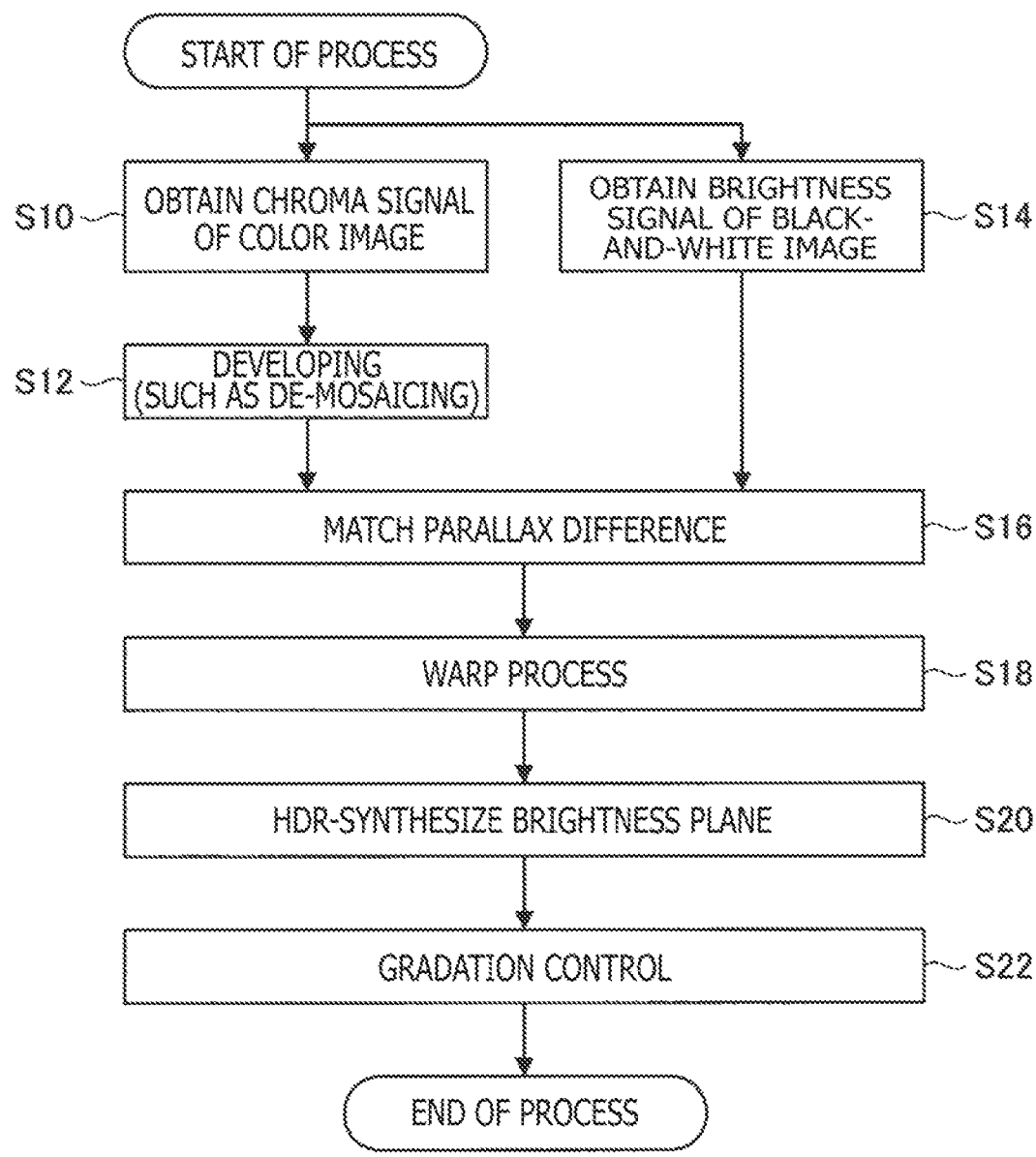
FIG. 17 is a flowchart depicting processes according to the first exemplary configuration depicted in FIG. 2.
Figure 23A:
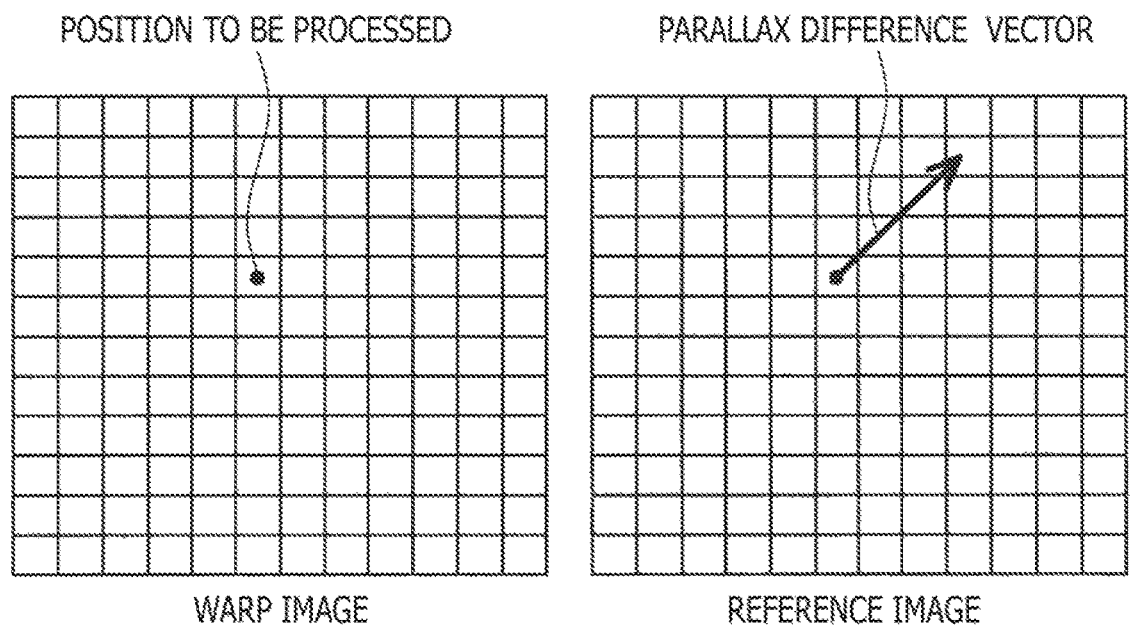
FIG. 23A is a schematic diagram for explaining the process at step S18 in FIG. 17.
Figure 23B:
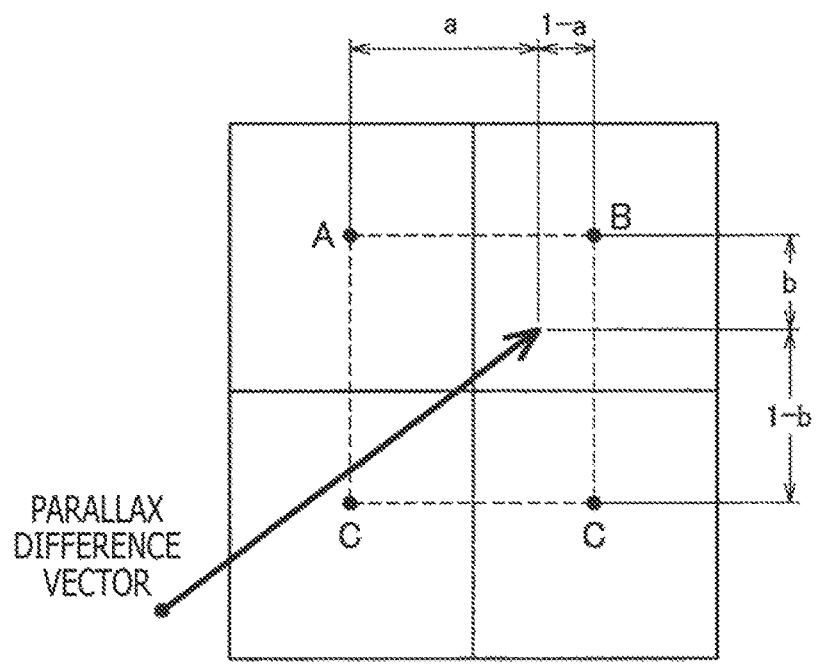
FIG. 23B is a schematic diagram depicting the case where bilinear interpolation is executed in FIG. 23A.

Processes executed in this embodiment will be described next. FIG. 17 is a flowchart depicting the processes according to the first exemplary configuration depicted in FIG. 2. At step S10, the imaging is first executed by the color image imaging element 1200, and the chroma signal is obtained. At step S12, an developing process (such as a demosaicing process) is executed for the signal obtained by the imaging. Moreover, at step S14, in parallel to step S10, the imaging is executed by the black-and-white image imaging element 1100 and the brightness signal of the black-and-white image is obtained. After steps S12 and S14, the process step advances to steps S16 and S18, and the parallax difference correcting part 110 executes a warping process of correcting the position gap between the black-and-white image and the color image to match the parallax differences of the images with each other is executed. More specifically, at step S16, the parallax difference vector of the position to be processed of each of the black-and-white image and the color image is obtained and, at step S18, as depicted in FIG. 23A, a process (motion compensation) of extracting the pixel values from the reference image is executed on the basis of the parallax difference vectors of the positions to be processed. At this time, in the case where the vector indicates the precision equal to or less than that of the pixel, the pixel value is extracted after executing interpolation using the pixels surrounding the pixel. Such an interpolation method is usable as a bilinear one, a bicubic one, a Lanczos one, or the like. FIG. 23B depicts an example of the bilinear interpolation, and depicts an example where an interpolated pixel is produced by blending the surrounding four pixels with each other on the basis of the distance weight for the interpolation position and each of the pixels. In addition, in FIG. 23A and FIG. 23B, squares each indicate a pixel.

At the next step S20, the HDR-synthesizing part 120 HDR-synthesizes the brightness signal of the black-and-white image as the long-accumulated image and the brightness signal of the color image as the short-accumulated image with each other. At the next step S22, the gradation control part 130 adjusts the gradation of the chroma signal. After step S22, the processing comes to an end.

Figure 18:
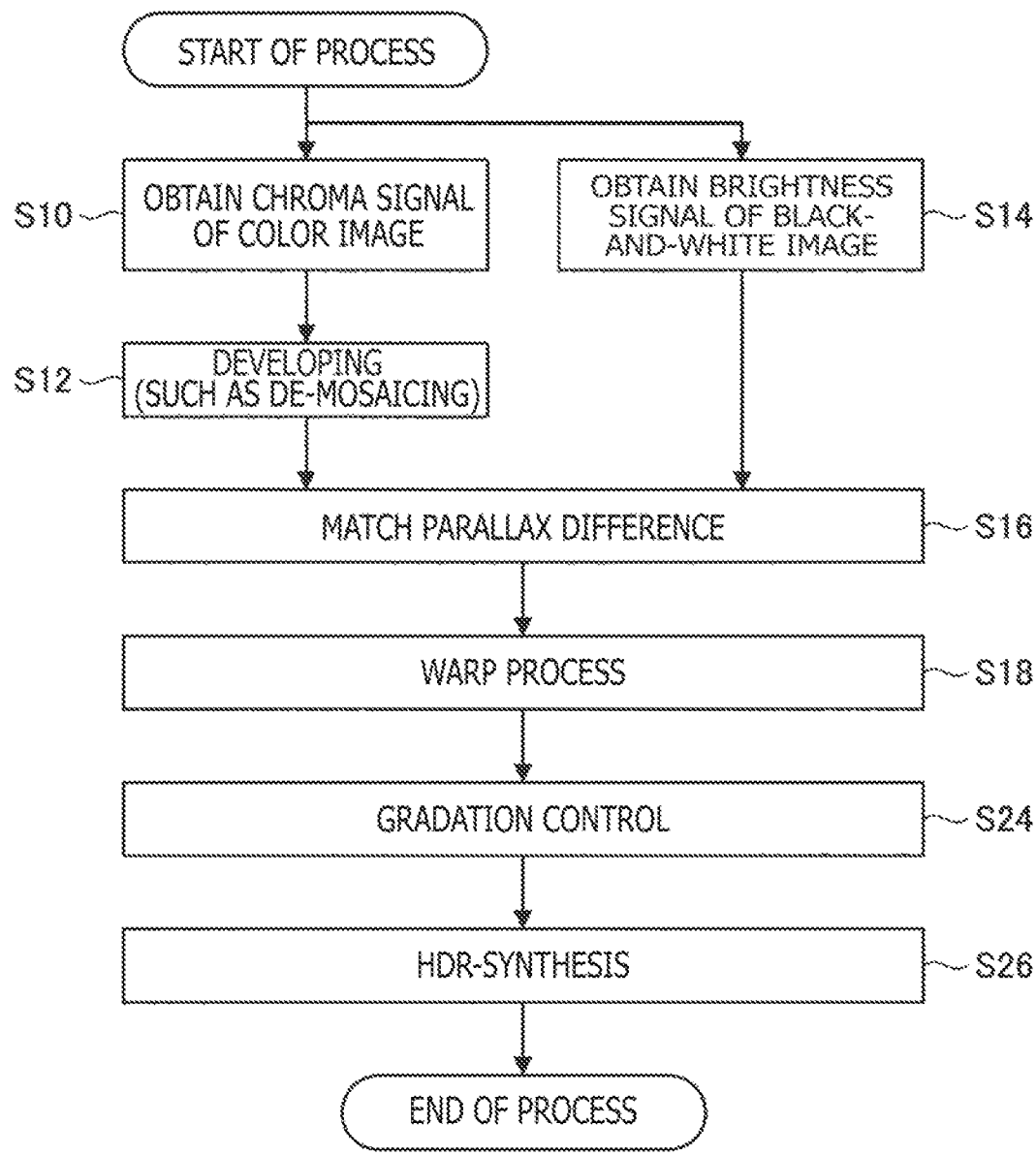
FIG. 18 is a flowchart depicting processes according to the second exemplary configuration depicted in FIG. 3.

FIG. 18 is a flowchart depicting the processes according to the second exemplary configuration depicted in FIG. 3. The processes up to step S18 are similar to those in FIG. 17. After step S18, at step S24, the gradation control part 130 adjusts the gradation of the chroma signal using the brightness signal of the black-and-white image as the guide signal. At the next step S26, the HDR-synthesizing part 120 executes the HDR synthesis using the color long-accumulated image and the color short-accumulated image that are input thereinto.

Figure 19:
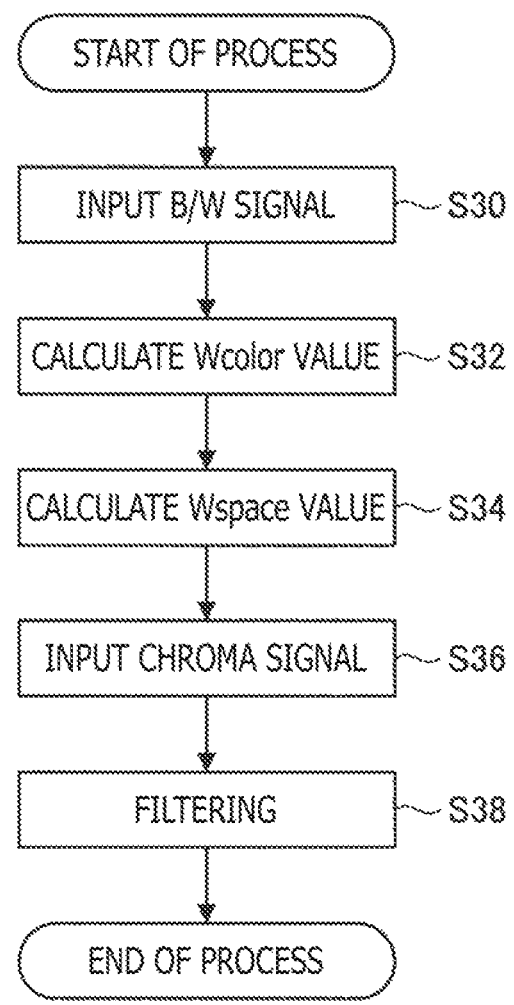
FIG. 19 is a flowchart depicting processes executed by the gradation control part depicted in FIG. 6.

FIG. 19 is a flowchart depicting the processes executed by the gradation control part 130 depicted in FIG. 6. At step S30, the brightness signal of the black-and-white image is first input. At step S32, the Wcolor value of the above-described joint-bilateral-type filter is calculated. At step S34, the Wspace value is calculated. At the next step S36, the chroma signal is input and, at step S38, the filtering process is executed using the above-described joint-bilateral-type filter, or the like.

Figure 20:
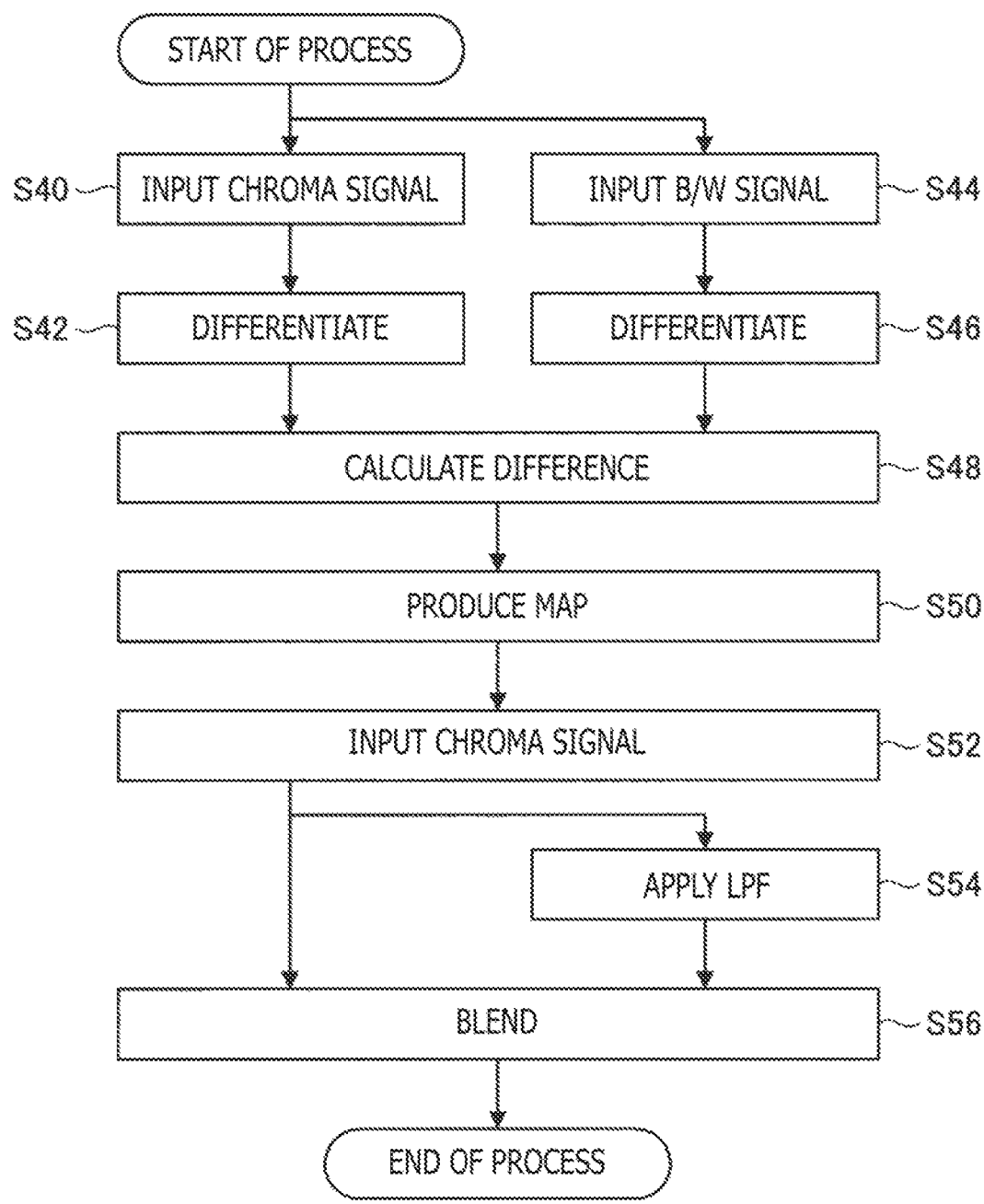
FIG. 20 is a flowchart depicting processes executed by the gradation control part in FIG. 8.

FIG. 20 is a flowchart depicting the processes executed by the gradation control part 130 depicted in FIG. 8. At step S40, the chroma signal is input into the differentiating part 134b and, at step S42, the differentiating part 134b differentiates the chroma signal. Moreover, to parallel to steps S40 and S42, at step S44, the signal of the black-and-white image is input into the differentiating part 134a and, at step S46, the differentiating part 134a differentiates the signal of the black-and-white image.

After steps S42 and S46, the process step advances to step S18 and the difference calculating part 136 determines the difference value between the chroma signal and the signal of the black-and-white image. At the next step S50, the map producing part 138 produces the map depicted in FIG. 9. At the next step S52, the chroma signal is input into the gradation restoring part 139 and, at step S54, the lowpass filter 139a executes the process for the chrome signal. At the next step S56, the blending part 139b blends the chroma image (Img2) to which the lowpass filter 139a is not applied and the chroma image (Img1) to which the lowpass filter 139a is applied with each other. After step S56, the processing comes to an end.

Figure 21:
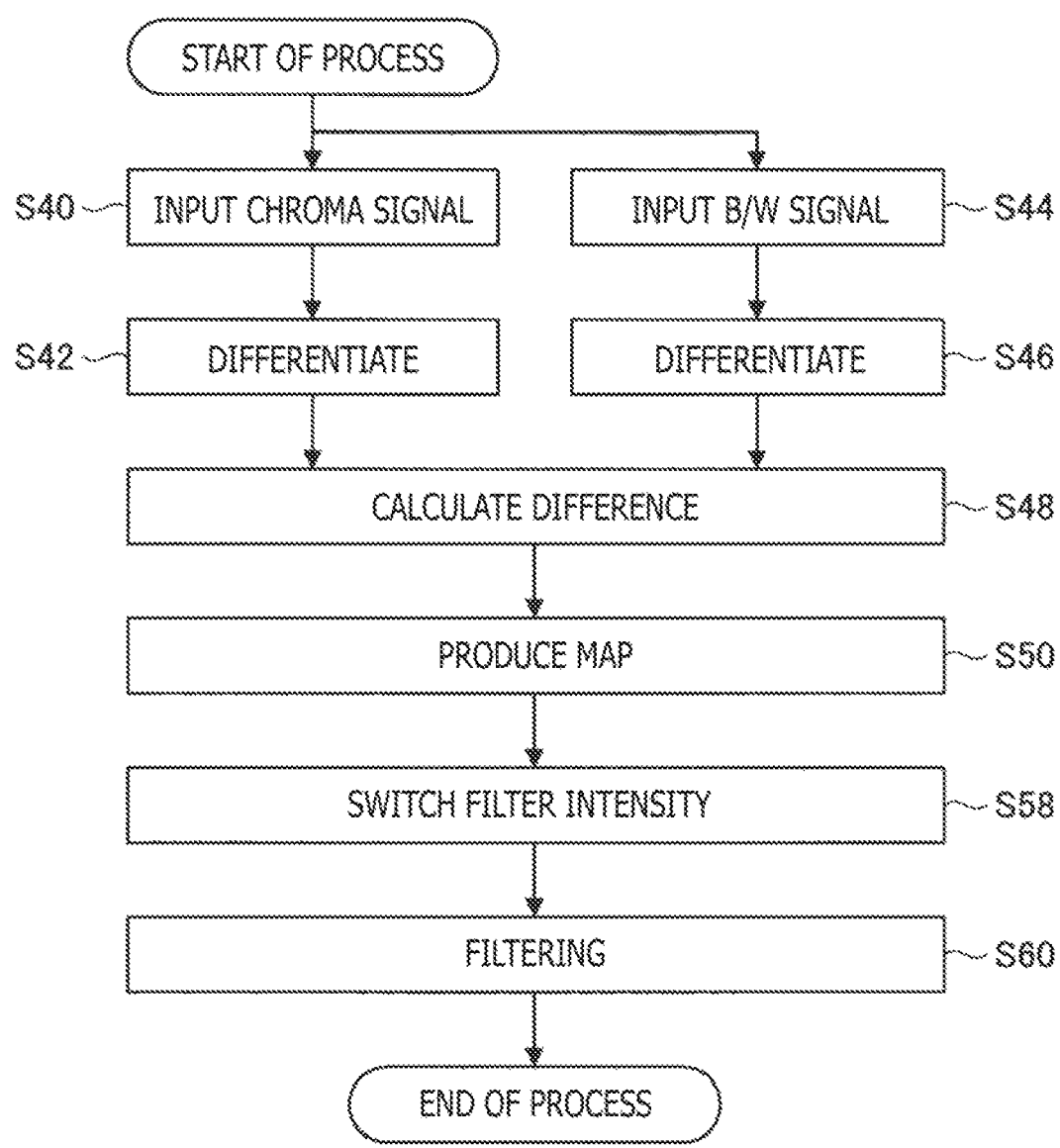
FIG. 21 is a flowchart depicting processes executed by the gradation restoring part in FIG. 8.

FIG. 21 is a flowchart depicting the processes executed by the gradation restoring part 139 in FIG. 8. The processes up to step S50 are similar to those in FIG. 20. At step S58, the filter factor switching part 139c switches the filter factor of the to pass filter 139a. At step S60, the filtering process is executed on the basis of the filter factor that is switched to at step S58. After step S60, the processing comes to an end.

Figure 22:
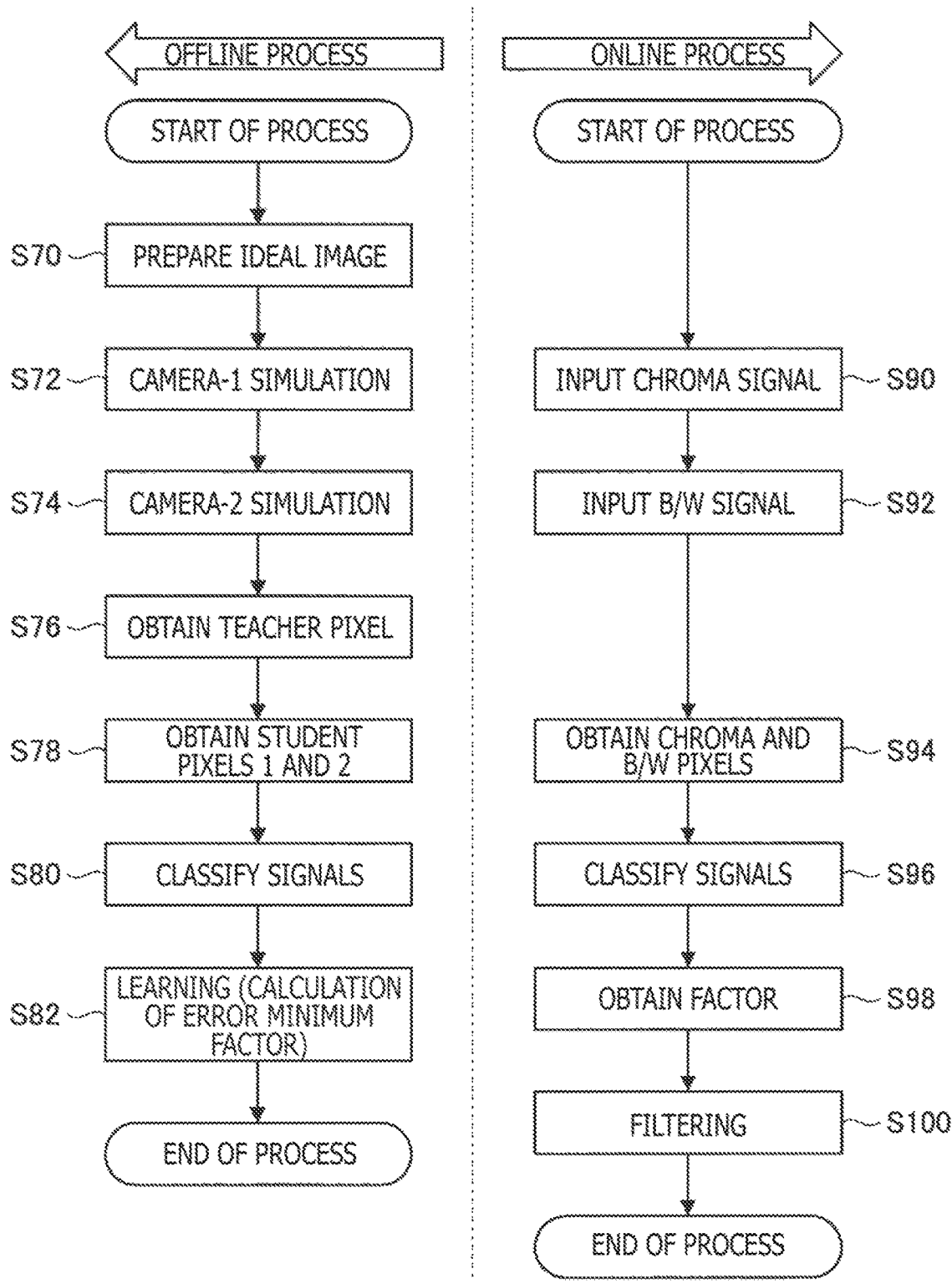
FIG. 22 is a flowchart depicting processes executed in the case where restoration of the gradation is executed using a framework for learning depicted in FIG. 13.

FIG. 22 is a flowchart depicting the processes executed in the case where the gradation restoration is executed using a framework for learning depicted in FIG. 13. In the offline process, at step S70, the ideal image is prepared. At the next step S72, the first camera simulation part 310 executes a simulation and, at the next step S74, the second camera simulation part 312 executes a simulation. At the next step S76, the pixel to be the teacher is obtained and, at the next step S78, the pixels 1 and 2 to be the students are obtained. At the next step S80, the signals are classified and, at the next step S82, the learning (calculation of the error minimum factor) is executed. After step S82, the processing comes to an end.

In the online process, at step S90, the chroma signal is input into the estimating part 304 and, at step S92, the signal of the black-and-white image is input into the classifying part 300. At step S94, the pixel values of the chroma signal and the signal of the black-and-white image are thereby obtained. At step S96, the classifying part 300 classifies the signals and, at step S98, the estimating part 304 obtains the factor from the learning database 302. At the next step, S100, the filtering is executed using the factor obtained at step S98. After step S100, the processing comes to an end.

8. About Variations of this Embodiment

Variations of this embodiment will be described below. The example has been described where the two cameras are used that are the camera imaging the black-and-white image (corresponding to the imaging element 1100) and the camera imaging the color image (corresponding to the imaging element 1200) in the above example while three or more cameras may be used. For example, three cameras, a camera A, a camera B, and a camera C may be used and their sensitivities may become higher in order of the camera A<the camera B<the camera C.

Figure 24:
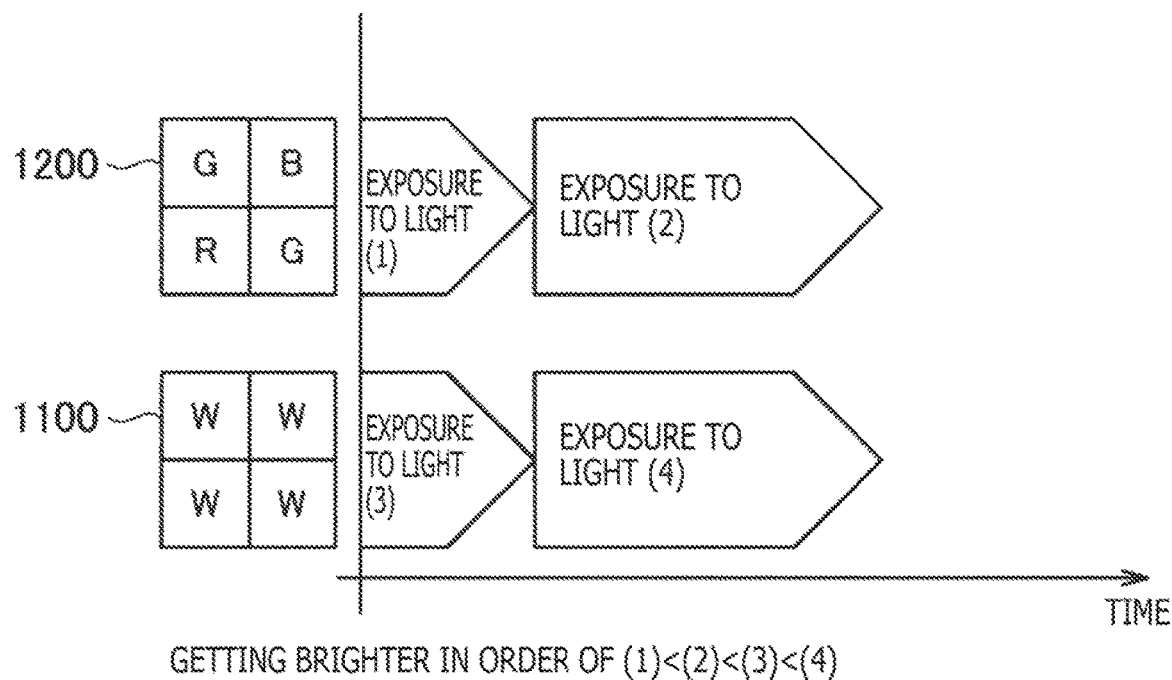
FIG. 24 is a schematic diagram depicting an example where patterns for exposure to light are increased by imaging with a difference in the exposure to light that corresponds to that between a long-accumulated image and a shot-accumulated image using plural cameras.

Moreover, combining with a consecutive-shooting HDR synthesis may be executed. As depicted in FIG. 24, plural cameras each execute imaging with difference in the exposure to light that corresponds to that between the long-accumulated image and the short-accumulated image, and the patterns of the exposure to light can thereby be increased. In the example depicted in FIG. 24, similar to that in FIG. 1, the example is depicted where the two cameras that are the black-and-white image imaging element 1100 and the color image imaging element 1200 are used and the imaging element 1100 and the imaging element 1200 each use two patterns of the time period for the exposure to light. In FIG. 24, the image becomes brighter in order of the exposure to light (1)<the exposure to light (2)<the exposure to light (3)<the exposure to light (4), and the difference in the exposure to light can be set thereamong. In this case, blurring (the object blurring) occurs depending on the difference in the time period for the exposure to light while the difference in the time period for the exposure to light can be reduced by the amount corresponding to the difference in the sensitivity relative to the conventional HDR, and an effect of alleviating the blurring can therefore be achieved.

Figure 25:
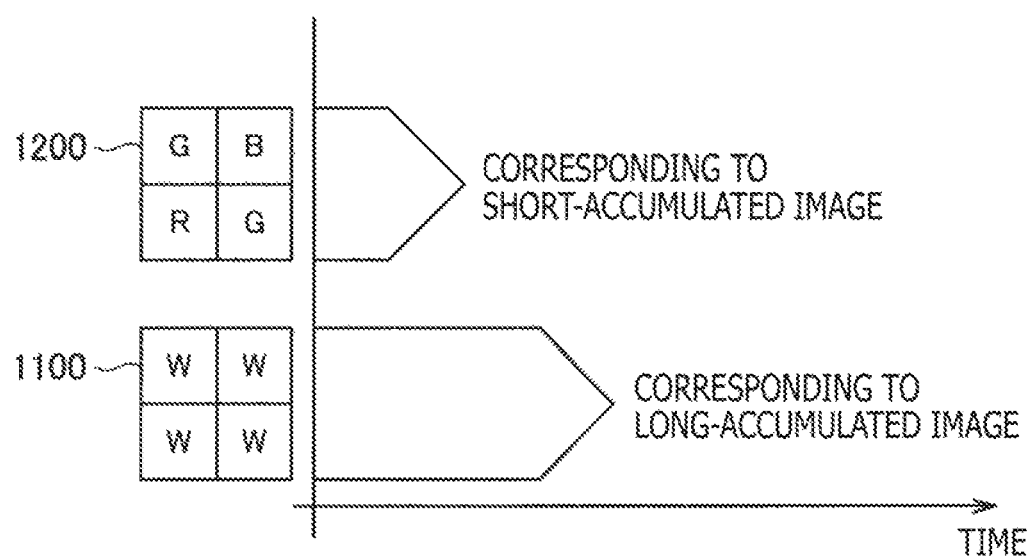
FIG. 25 is a schematic diagram depicting an example where the time period for exposure to light of imaging by an imaging element of a black-and-white image corresponding to the long-accumulated image, is set to be longer than that in FIG. 1.

To avoid any blurring, it is advantageous that no difference in the time period for the exposure to light is set among the plural cameras while the difference in the time period for the exposure to light may be set for a stronger HDR effect to be achieved. In the example depicted in FIG. 25, the time period for the exposure to light for imaging by the black-and-white image imaging element 1100 corresponding to the long-accumulated image is increased than that in FIG. 1. In this case, blurring occurs depending on the difference in the time period for the exposure to light. However, compared to the case where short-time exposures to light and long-time—exposures to light are sequentially executed at different times of day and for different exposure time periods using the one color image imaging element 1200 to execute the HDR synthesis, the difference in the time period for the exposure to light can be reduced by the amount corresponding to the difference in the sensitivity and an effect of alleviating the blurring can be achieved.

Figure 26:
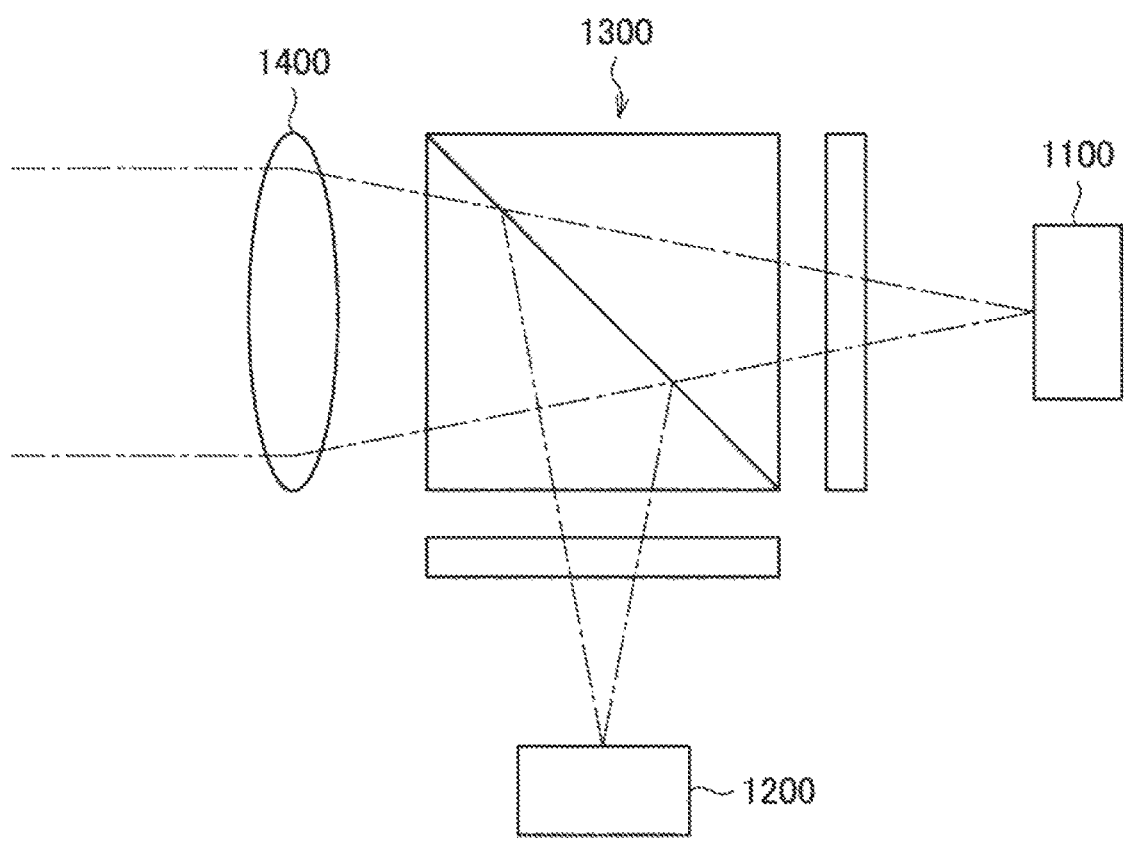
FIG. 26 is a schematic diagram depicting an example where a beam splitter is used.

FIG. 26 is a schematic diagram depicting an example where a beam splitter 1300 is used. An object image entering from a lens 1400 is split by the beam splitter 1300 and is imaged by the black-and-white image imaging element 110 and the color image imaging element 1200. In the case where plural cameras are arranged side by side, the parallax difference is generated as above while an apparatus may be used that aligns the optical axes of the black-and-white image and the color image with each other. The parallax difference correcting part 110 is thereby unnecessary and the configuration of the image processing apparatus 1000 can be further simplified.

Figure 27:
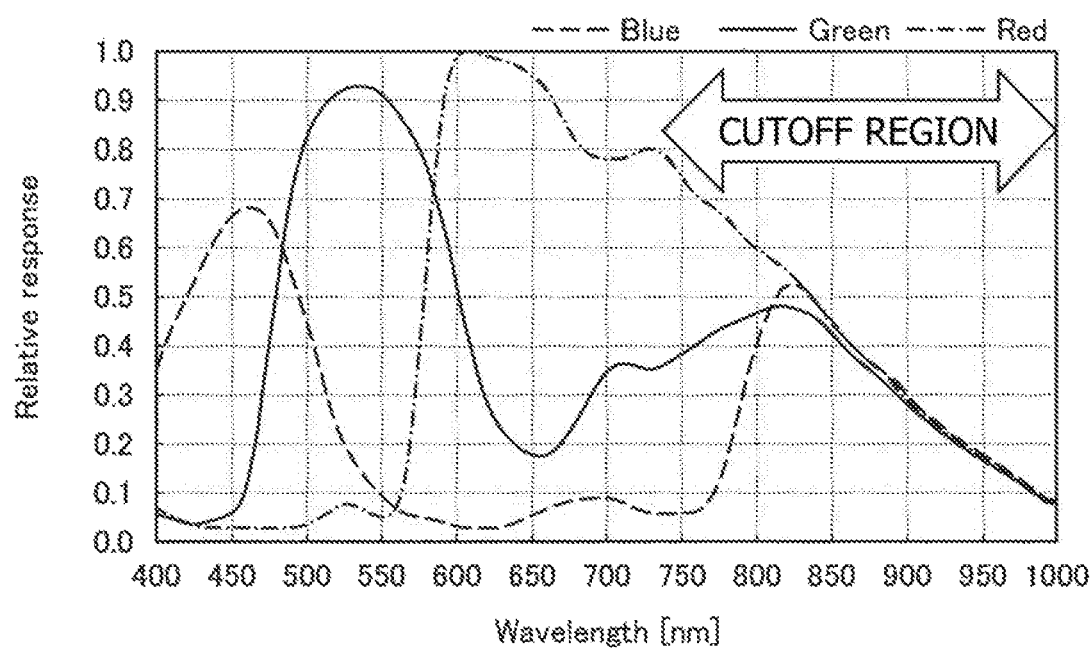
FIG. 27 is a schematic diagram depicting an example where no IR (infrared radiation) cutoff filter is used to facilitate further enhancement of the sensitivity for the black-and-white image.

FIG. 27 is a schematic diagram depicting an example where no IR (infrared radiation) cutoff filter is used to facilitate further enhancement of the sensitivity for the black-and-white image. Because the infrared region is usually cut off for use, the light in the cutoff region depicted in FIG. 27 is cut off by using the IR cutoff filter. More light can be captured in the imaging element 1100 by attaching no IR cutoff filter, and further enhancement of the sensitivity can therefore be realized. The imaging elements may each be used in the passive state where no IR flash or no floodlight is used while a brighter image can be captured by using no IR (infrared radiation) cutoff filter in an active state where an IR flash or a floodlight is used.

The preferred embodiment of this disclosure has been described in detail as above with reference to the accompanying drawings while the technical scope of this disclosure is not limited to the examples. It is obvious that those skilled in the art can anticipate various change examples or modification examples within the scope of the technical idea described in the appended claims, and it should be understood that these examples are also naturally encompassed in the technical scope of this disclosure.

Moreover, the effects described herein are absolutely explanatory ones or exemplary ones and are not limiting ones. In short, the technique according to this disclosure can achieve other effects that are apparent for those skilled in the art from the description herein together with the above effects or instead of the above effects.

Relating to the above, the configurations as below also pertain to the technical scope of this disclosure.

(1) An image processing apparatus including:
a gradation control part that obtains a brightness signal of a black-and-white image and a chroma signal of a color image obtained by imaging a same object as that for the black-and-white image and that controls gradation of the chroma signal on the basis of the brightness signal.

(2) The image processing apparatus described in the above (1), in which
the gradation control part includes a gradation restoring filter that restores the gradation of the chroma signal using the brightness signal as guide information.

(3) The image processing apparatus described in the above (2), in which
the gradation restoring filter includes a non-linear filter that uses a black-and-white image as a guide.

(4) The image processing apparatus described in the above (1), in which
the gradation control part includes
a difference calculating part that calculates a difference between the brightness signal and the chroma signal, and
a gradation restoring part that restores the gradation of the chroma signal on the basis of the difference.

(5) The image processing apparatus described in the above (4), in which
the gradation restoring part restores the gradation such that a frequency region of the chroma signal becomes lower as the difference is greater.

(6) The image processing apparatus described in the above (4), in which
the gradation restoring part includes
a lowpass filter that causes a low frequency component of the chroma signal to pass therethrough, and
a blending part that blends the chroma signal and the low frequency component of the chroma signal with each other, and
the blending part blends the chroma signal and the low frequency component of the chroma signal with each other by setting a ratio of the low frequency component to be higher as the difference is greater.

(7) The image processing apparatus described in the above (4), in which
the gradation restoring part includes
a lowpass filter that causes a low frequency component of the chroma signal to pass therethrough, and
a filter intensity switching part that more enhances an intensity of the lowpass filter as the difference is greater.

(8) The image processing apparatus described in the above (1), in which
the gradation control part includes
a difference calculating part that calculates a difference between the brightness signal and the chroma signal, and
a filtering processing part that obtains a filter factor corresponding to the difference from a database and that applies a filtering process corresponding to the filter factor to the chroma signal, and
the database has pieces of guide information each obtained by converting an ideal image into a black-and-white image, degraded images each obtained by converting the ideal image into a color image, and the filter factors each to obtain the ideal image on the basis of the guide information and the degraded image, accumulated therein by learning.

(9) The image processing apparatus described in any one of the above (1) to (8), including:
an HDR-synthesizing part that HDR-synthesizes the brightness signal of the black-and-white image and a brightness signal of the color image captured at a sensitivity lower than that for the black-and-white image, with each other.

(10) The image processing apparatus described in the above (9), in which
the gradation control part restores the gradation of the chroma signal on the basis of a brightness signal with an expanded dynamic range, the brightness signal being obtained by the HDR synthesis.

(11) The image processing apparatus described in any one of the above (1) to (8), including:
an HDR-synthesizing part that HDR-synthesizes the brightness signal of the black-and-white image and the chroma signal whose gradation is controlled by the gradation control part and the brightness signal and the chrome signal of the color image captured at a sensitivity lower than that for the black-and-white image, with each other.

(12) The image processing apparatus described in any one of the above (1) to (11), including:
a converting part that converts an RGB signal of the color image into a brightness signal and the chroma signal.

(13) The image processing apparatus described in any one of the above (1) to (12), in which
the black-and-white image and the color image are captured at the same time by an imaging element different from each other, and
the image processing apparatus includes a parallax difference correcting part that corrects a parallax difference between the black-and-white image and the color image.

(14) The image processing apparatus described in any one of the above (1) to (12), in which
the black-and-white image and the color image are obtained by imaging the object with a difference in time for the imaging.

(15) An imaging apparatus including:
a first imaging element that images an object to obtain a black-and-white image;
a second imaging element that images the object to obtain a color image; and
an image processing apparatus that obtains a brightness signal of the black-and-white image and a chroma signal of the color image and that controls gradation of the chroma signal on the basis of the brightness signal.

(16) The imaging apparatus described in the above (15), in which no infrared radiation cutoff filter is disposed on the first imaging element and the second imaging element.

REFERENCE SIGNS LIST

100 Converting part
110 Parallax difference correcting part
120 HDR-synthesizing part
130 Gradation control part
132 Gradation restoring filter
136 Difference calculating part
139 Gradation restoring part
139a Lowpass filter
139b Blending part
139c Filter factor switching part
139d Lowpass filter
302 Learning DB
304 Estimating part
1000 Image processing apparatus
1100, 1200 Imaging element

The invention claimed is:

1. An image processing apparatus comprising:
a gradation control part configured to
obtain a brightness signal of a black-and-white image,
obtain a chroma signal of a color image obtained by imaging a same object as that for the black-and-white image, and
control gradation of the chroma signal on a basis of the brightness signal,
wherein the gradation control part includes a gradation restoring filter configured to restore the gradation of the chroma signal using the brightness signal as guide information,
wherein the gradation restoring filter includes a non-linear filter configured to use the black-and-white image as a guide, and
wherein the gradation control part is implemented via at least one processor.

2. The image processing apparatus according to claim 1, wherein the gradation control part includes a gradation restoring part configured to restore the gradation of the chroma signal on a basis of a difference between the brightness signal and the chroma signal, and
wherein the gradation restoring part is implemented via at least one processor.

3. The image processing apparatus according to claim 2, wherein
the gradation restoring part restores the gradation such that a frequency region of the chroma signal becomes lower as the difference is greater.

4. The image processing apparatus according to claim 2, wherein the gradation restoring part includes
a lowpass filter configured to cause a low frequency component of the chroma signal to pass therethrough, and
a blending part configured to blend the chroma signal and the low frequency component of the chroma signal with each other, and
wherein the blending part blends the chroma signal and the low frequency component of the chroma signal with each other by setting a ratio of the low frequency component to be higher as the difference is greater.

5. The image processing apparatus according to claim 2, wherein
the gradation restoring part includes
a lowpass filter configured to cause a low frequency component of the chroma signal to pass therethrough, and
a filter intensity switching part configured to enhance an intensity of the lowpass filter as the difference is greater.

6. The image processing apparatus according to claim 1, wherein
the gradation control part includes
a difference calculating part configured to calculate a difference between the brightness signal and the chroma signal, and
a filtering processing part configured to obtain a filter factor corresponding to the difference from a database and apply a filtering process corresponding to the filter factor to the chroma signal, and
the database has pieces of guide information each obtained by converting an ideal image into a black-and-white image, degraded images each obtained by converting the ideal image into a color image, and the filter factors each to obtain the ideal image on a basis of the guide information and the degraded image, accumulated therein by learning.

7. The image processing apparatus according to claim 1, further comprising:
an HDR-synthesizing part configured to HDR-synthesize the brightness signal of the black-and-white image and a brightness signal of the color image captured at a sensitivity lower than that for the black-and-white image, with each other,
wherein the HDR-synthesizing part is implemented via at least one processor.

8. The image processing apparatus according to claim 7, wherein the gradation control part restores the gradation of the chroma signal on a basis of a brightness signal with an expanded dynamic range, the brightness signal with the expanded dynamic range being obtained by the HDR synthesis.

9. The image processing apparatus according to claim 1, further comprising:
an HDR-synthesizing part configured to HDR-synthesize the brightness signal of the black-and-white image and the chroma signal whose gradation is controlled by the gradation control part and the brightness signal and the chroma signal of the color image captured at a sensitivity lower than that for the black-and-white image, with each other,
wherein the HDR-synthesizing part is implemented via at least one processor.

10. The image processing apparatus according to claim 1, further comprising:
a converting part configured to convert an RGB signal of the color image into a brightness signal and the chroma signal,
wherein the converting part is implemented via at least one processor.

11. The image processing apparatus according to claim 1, wherein the black-and-white image and the color image are captured at a same time by an imaging element different from each other,
wherein the image processing apparatus comprises a parallax difference correcting part configured to correct a parallax difference between the black-and-white image and the color image, and wherein the parallax difference correcting part is implemented via at least one processor.

12. The image processing apparatus according to claim 1, wherein
the black-and-white image and the color image are obtained by imaging the object with a difference in time for the imaging.

13. An imaging apparatus comprising:
a first imaging element configured to image an object to obtain a black-and-white image;
a second imaging element configured to image the object to obtain a color image;
an image processing apparatus configured to obtain a brightness signal of the black-and-white image and a chroma signal of the color image and control gradation of the chroma signal on a basis of the brightness signal; and
a gradation restoring filter configured to restore the gradation of the chroma signal using the brightness signal as guide information,
wherein the gradation restoring filter includes a non-linear filter configured to use the black-and-white image as a guide.

14. The imaging apparatus according to claim 13, wherein no infrared radiation cutoff filter is disposed on the first imaging element and the second imaging element.

* * * * *